US008341620B2

(12) United States Patent
Criddle et al.

(10) Patent No.: US 8,341,620 B2
(45) Date of Patent: Dec. 25, 2012

(54) STREAMING OPTIMIZED VIRTUAL APPLICATION IMAGES

(75) Inventors: Jefferson B. Criddle, Bellevue, WA (US); Gurashish Singh Brar, Redmond, WA (US); Anthony D. Krueger, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 12/491,664

(22) Filed: Jun. 25, 2009

(65) Prior Publication Data

US 2010/0333085 A1 Dec. 30, 2010

(51) Int. Cl.
*G06F 9/445* (2006.01)

(52) U.S. Cl. .................. 717/174; 717/151; 715/239

(58) Field of Classification Search .................. None
See application file for complete search history.

(56) References Cited

U.S. PATENT DOCUMENTS

| | | | | |
|---|---|---|---|---|
| 7,228,497 | B2 * | 6/2007 | Lander | 715/234 |
| 7,246,351 | B2 * | 7/2007 | Bloch et al. | 717/175 |
| 7,373,451 | B2 | 5/2008 | Lam et al. | |
| 7,787,818 | B2 * | 8/2010 | Shapiro et al. | 455/3.01 |
| 2006/0031537 | A1 * | 2/2006 | Boutboul et al. | 709/228 |
| 2007/0078988 | A1 | 4/2007 | Miloushev et al. | |
| 2009/0031228 | A1 | 1/2009 | Buchs et al. | |
| 2010/0262713 | A1 * | 10/2010 | Jones et al. | 709/231 |
| 2010/0268836 | A1 * | 10/2010 | Jabri et al. | 709/231 |

OTHER PUBLICATIONS

Application Virtualization Solutions, http://www.installsite.org/pages/en/virtualization/application_virtualization.shtm, pp. 1-6 (Printed from Internet Apr. 15, 2009).
Farber, D., "The virtual application," http://techupdate.zdnet.com/techupdate/stories/main/The_virtual_application.html, pp. 1-3 (May 19, 2004).
Kim, J. et al., "The next generation telematics service platform in ubiquitous environments," *The 9th International Conference on Advanced Communication Technology*, vol. 2, pp. 1263-1266 (Feb. 12-14, 2007).
Leighton, T., "Improving Performance on the Internet," *Communications of the ACM*, vol. 52, No. 2, 6 pages (Dec. 4, 2008).
Performance Brief: Microsoft App-V, http://www.riverbed.com/docs/PerformanceBriefRiverbedMicrosoftAppV.pdf, 3 pages (Copyright 2008).
Spruijt, R., "Application Virtualization Solutions Overview and Feature Compare Matrix," http://74.125.77.132/search?q=cache:-VWs40Y1GzR4J:www.virtuall.nl/articles/applicationanddesktop-delivery/ApplicationVirtualizationSolutionsOverviewandFeature-Matrix.pdf+%22microsoft+application+virtualization%22+save+time+prefetch&cd=1&hl=en&ct=clnk#13, pp. 1-37 (Jan. 2009).

* cited by examiner

*Primary Examiner* — Elias Mamo
(74) *Attorney, Agent, or Firm* — Merchant & Gould

(57) ABSTRACT

Embodiments provide an optimized virtual application or suite of virtual applications, but are not so limited. In an embodiment, components of a system are configured to generate an optimized virtual package that can be used in a virtual application streaming environment. Components of the system can provide bits of the optimized virtual package based in part on scenario mappings associated with a user action and/or an application or application feature. In one embodiment, a client virtualization handler can operate to download byte ranges of an optimized virtual package including re-prioritizing byte range download operations as part of streaming virtual application functionality over a computing network.

13 Claims, 6 Drawing Sheets

STREAMING OPTIMIZED VIRTUAL APPLICATION IMAGES

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Virtualization technology has been used to create virtual computing environments including virtual servers and virtual software applications. Network and other computing constraints can limit a user's experience when deploying large virtual applications and/or application suites over the Internet that may include slower and less reliable networks. In some cases, a virtual application streaming experience for a general Internet consumer can be quite different as compared to a user of an enterprise business computing network. For example, virtual applications accessed over the Internet may appear to hang, freeze, or otherwise malfunction when using limited bandwidth channels and processing resources. Correspondingly, a virtual application experience is based in part on the limitations of the user computing device and/or network infrastructure used in streaming a virtual application or suite of applications.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide an optimized virtual application or suite of virtual applications, but are not so limited. In an embodiment, components of a system are configured to generate an optimized virtual package that can be used in a virtual application streaming environment. Components of the system can provide bits of the optimized virtual package based in part on scenario mappings associated with a user action and/or an application or application feature. In one embodiment, a client virtualization handler can operate to download byte ranges of an optimized virtual package including re-prioritizing byte range download operations as part of streaming virtual application functionality over a computing network.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
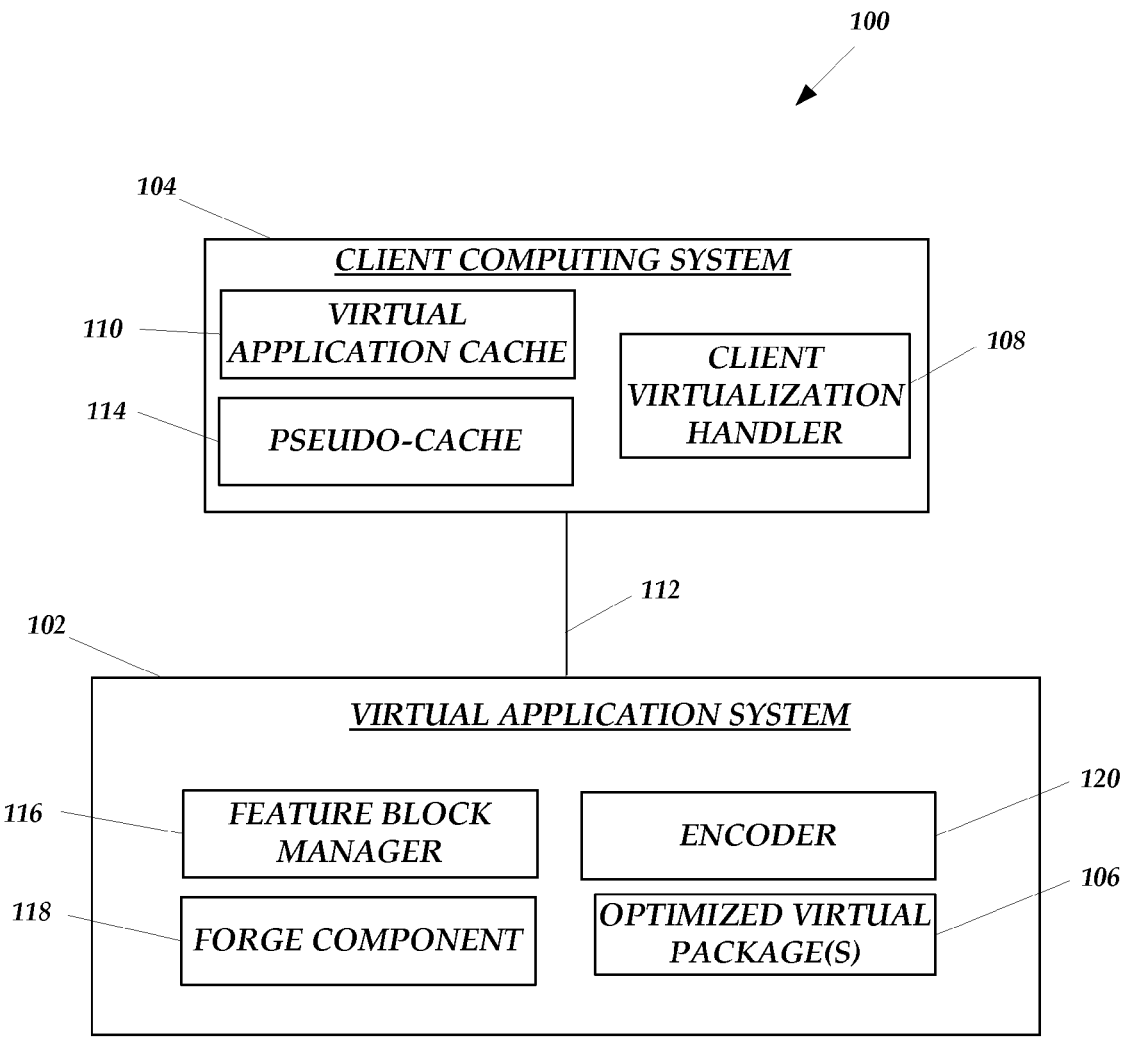
FIG. 1 depicts a block diagram of an exemplary system configured to provide a virtual application environment.

Embodiments are configured to provide a virtual application or suite of virtual applications of a virtual package, but are not so limited. In an embodiment, a virtual application system is configured to provide virtual application features and functionality as part of a scenario-driven virtual application streaming environment. For example, components of the virtual application system can be used to provide bytes of an optimized virtual package based in part on one or more scenario mappings associated with features and functionality of a number of virtualized software applications, such as a presentation application, word processing application, spreadsheet application, note-taking application, email application, database application, and/or other applications. The optimized virtual package includes a number of feature or data blocks, wherein certain feature blocks, or portions thereof, can be provided to a client based on a current need or operation as part of scenario-based byte streaming operations.

Correspondingly, components of the system can be used to provide virtualized software applications and associated features over a network, such as the Internet for example, to end-users. A user can use a hosted virtualized application or suite of applications without having to manually install the application or suite of applications locally. Additionally, users can use the optimized virtual application as part of an offline mode once bits associated with all or a portion of the virtual package have been downloaded and stored in local memory.

In an embodiment, a computing system or device can use a client virtualization handler to request and/or download bits and/or byte ranges of an optimized virtual package. The client virtualization handler can operate to control bit download operations including, but not limited to: pausing byte range downloads, re-prioritizing byte range downloads, and/or restarting or canceling byte range downloads as part of providing virtual application features and functionality to an end-user. The client virtualization handler can use user actions and input as part of providing virtual applications and associated features by downloading byte ranges of a virtual package based in part on a scenario-based bit or feature block mapping. For example, the client virtualization handler can use a user action to determine if a scenario and/or feature block of an optimized virtual application image is mapped or corresponds to the user action and should be prioritized for streaming. In one embodiment, a bootstrapping process can be used to pre-fetch application byte ranges as part of the installation process of a client virtualization handler.

In yet another embodiment, a build process can be used to generate an optimized virtual package or image, wherein the optimized virtual package includes bits and byte ranges organized according to a number of scenarios. The optimized virtual package can be generated to include functionality and features of a select number of applications included as part of a virtual suite of applications. A client virtualization handler or other application can be used to download portions of the optimized virtual package based in part on a scenario-driven streaming process and/or user action. For example, byte ranges of the optimized virtual image can be downloaded or streamed to the virtual application handler based in part on user input or actions within a virtual application streaming environment.

FIG. 1 is a block diagram of an exemplary virtual application streaming environment 100 including components configured to provide virtual application features and functionality to end-users, according to an embodiment. As described below, components of the environment 100 can be configured to stream bits and/or byte ranges corresponding to features of a virtual application or suite of virtual applications, but are not so limited.

In an embodiment, components of the environment 100 can be configured to, but are not so limited: collect and/or apply virtual image optimization data using automation operations; define and/or modify multiple user scenarios/application features captured in multiple feature blocks (FBs) beyond FB1 and FB2; perform operations on captured optimization data to modify and/or create new feature blocks; pre-fetch virtual image blocks as part of virtualization component installation; dynamically determine bits of a virtual application launch to delay while downloading scenario-based byte ranges in the background based in part on user actions; dynamically reorder bits and/or byte ranges of background stream based in part on user actions; reduce and/or prevent future out-of-sequence (OOS) requests by predicting user behavior based in part on prior actions and loading the bits corresponding to the predicted behavior; map user actions to scenarios and/or feature blocks; and/or detect when and how to yield bit streaming to OOS requests.

In one embodiment, the environment 100 can include functionality associated with the MICROSOFT® SOFTGRID® virtualization system, including sequencing code, headers, libraries, etc. A virtual application can include a virtualized instance of an application, such as a virtualized word processing application for example. A virtual application can also include a virtualized instance of a product, which can include multiple applications, such as a suite of applications (e.g., a virtual package may include a virtualized word processing application, virtualized spreadsheet application, virtualized presentation application, etc.)

As shown in FIG. 1, the environment 100 includes a virtual application system 102 and a client computing system or device 104, but is not so limited. The client computing system 104 and the virtual application system 102 include at least one processor and associated memory. The virtual application system 102 includes a number of components configured to provide virtual application features and functionality to the client computing system 104, as discussed further below. In one embodiment, components of the virtual application system 102 can be used to generate an optimized virtual package 106 or application image. As discussed below, the client computing system 104 can use a client virtualization handler 108 (also referred to as virtual application handler of various embodiments) to download all or a portion of the optimized virtual package 106 to a virtual application cache 110 over communication channel 112.

In an embodiment, the client virtualization handler 108 uses a download process that is based in part on a user action or input to track a scenario-based bit mapping of the optimized virtual package 106. For example, the client virtualization handler 108 can use a current or prior user action as part of a scenario-based download process to download byte ranges corresponding to feature blocks of the optimized virtual package 106 to the virtual application cache 110. The pseudo-cache 114 or bootstrap cache can be used to store pre-fetched bits and/or byte ranges as part of a bootstrapping process discussed further below. The client virtualization handler 108 can use downloaded bits and/or byte ranges to provide virtual application features and functionality to an end-user. While one client computing system 104 is shown, the environment 100 can include a plurality of such systems and other components.

With continuing reference to FIG. 1, the virtual application system 102 of an embodiment includes a feature block manager or component 116, a forge component 118, and a virtual application encoder 120 (referred to as encoder 120), but is not so limited. In one embodiment, the encoder 120 includes functionality of an extensible markup language (XML) encoder and can operate to generate an optimized virtual package 106 that can be used by computing clients.

In one embodiment, the encoder 120 can operate to generate an optimized application image (e.g., optimized SFT file) and the forge component 118 can operate to generate a faux feature block file or data structure(s) as part of generating an optimized virtual package 106. The optimized virtual package 106 of an embodiment can be based in part on an un-optimized SFT file which can be used to generate optimization data or an optimization file (e.g., OPTXML) describing various application features and/or functionality.

The encoder 120 can operate to generate the optimized application image using an algorithm that orders data blocks resulting in fewer byte ranges for each feature block. In one embodiment, the encoder 120 can operate to generate and order data blocks of an image (e.g., SFT image) according to: 1) AppV Feature Block (e.g., FB1 before FB2); 2) File "version number" wherein new or changed blocks are marked with a corresponding version number; 3) primary FFB(s) in increasing order; 4) secondary FFB(s) in decreasing order; and, 5) an arbitrary order.

In accordance with an embodiment, primary FFB(s) and secondary FFB(s) refer to ordering of blocks by Feature Block as specified in the optimization data. Feature Blocks can be assigned index values based in part on their appearance in the optimization data. For example, the first Feature Block can be assigned index 1, the second Feature Block can be assigned index 2, etc. For Primary FFB(s) of one embodiment, each block can be ordered by the first (and hence lowest-index value) Feature Block that includes the corresponding block ranging from the lowest index value to the highest index value. Blocks that are not included in any Feature Block can be sorted last. For Secondary FFB(s) of one embodiment, each block can be ordered by the second Feature Block that includes the corresponding block ranging from the highest index value to the lowest index value, wherein blocks that are not included in any Feature Block can be sorted first.

The virtual application system 102 of an embodiment uses a number of files or data sources as inputs when generating the optimized virtual package 106. In one embodiment, the inputs to the virtual application system 102 include a scenario authoring file (e.g., ScenarioAuthoring.XML), a base or un-optimized SFT image, and a faux feature block authoring file (e.g., FFBAuthoring.XML). Generation of an un-optimized SFT image is described further below as part of the description of FIG. 2.

In one embodiment, the scenario authoring file maps automation scenarios to feature blocks of the optimized virtual package 106. For example, Microsoft® Office® automation scenarios can be referred to by numerical OasysIDs.

An XML schema description of an embodiment for a scenario authoring file includes the following:

1) <Include>—top level element;
2) <Scn>—an element that maps an automation scenario to an intermediate scenario ID;

a) "Id" attribute—an identifier for this scenario;

b) "OasysId" attribute—an identifier that maps to an automation scenario;

3) <FB> an element that describes what operations to run on which data to define a feature block;

a) "Id" attribute—a unique identifier for a feature block (Id="1" is a special identifier for Feature Block 1);

b) "Cmd" attribute—fully-parenthesized expression of set operations to run on scenarios in order to compose a feature block (e.g., Feature Block 1 equals the intersection of all major application boot feature blocks).

An example scenario authoring file can be constructed as:

```
<?xml version="1.0" encoding="utf-8" ?>
<Include>
  <Scn Id="ScnPPTBoot" OasysId="132088" />
  <Scn Id="ScnWordBoot" OasysId="135534" />
  <Scn Id="ScnXlBoot" OasysId="132088" />
  <FB Id="WordBoot" Cmd="ScnWordBoot" />
  <FB Id="PPTBoot" Cmd="ScnPPTBoot" />
  <FB Id="XlBoot" Cmd="ScnXlBoot" />
  <FB Id="1" Cmd="( ScnWordBoot INTERSECTION ScnExcelBoot ) INTERSECTION ScnPPTBoot" />
</Include>
```

In an embodiment, the virtual application system 102 can use the scenario authoring file and an un-optimized virtual application image to generate optimization data including the corresponding bits required for a number of application-related tasks or scenarios. Static and automatically generated optimization data can be used to reorder bits (e.g., byte ranges and/or feature blocks) of the un-optimized SFT file and the forge component 118 can generate an associated faux feature block file describing mappings or locations of byte ranges and/or feature blocks of the optimized SFT file corresponding to various scenarios and/or tasks.

Optimization data or files of an embodiment can be generated using various automation scenarios which can vary greatly depending upon each underlying scenario and optimization operation. For example, one scenario may include booting a word processing application, typing a sentence, performing a spell check, saving the document, and loading a spreadsheet. Accordingly, optimization data can be used to describe parts or portions, such as byte ranges for example, of various files or data structures used to perform a task or tasks of a number of related virtual applications.

In one embodiment, the feature block manager 116 can generate optimization data based in part on information of a number of OOS logs obtained using an un-optimized SFT image with a background download stream disabled or reduced. As one example, automation operations can be used to generate OOS logs that include blocks or byte ranges of information associated with a word processing application boot scenario such as block or byte ranges of a wordpr.exe file, a msopr.dll file, and a wwlibpr.dll file. The OOS logs of this example include information (e.g., blocks, byte ranges, operational order, etc.) of the parts of files or data ranges required to boot the word processing application.

In an embodiment, the feature block manager 116 can be used to translate information contained in a number of OOS logs to OPTXML. The feature block manager 116 of one embodiment can use the scenario authoring file to generate optimization data, OPTXML for example, for each listed feature block element. The encoder 120 of an embodiment can use the generated optimization data (e.g., OPTXML) and an un-optimized virtual application image to generate a feature block file (e.g., FeatureBlock.XML) and an optimized virtual application image (e.g., optimized SFT file).

The encoder 120 can use the optimization data as an input to map byte ranges of a number of application images to various application scenarios based in part on a sequence of user directives and/or actions. For example, the encoder 120 can operate to reorder blocks of the un-optimized virtual application image (e.g., SFT file) to generate the optimized virtual application image by locating bits having Id="1" to the front or beginning of Feature Block 1 (FB1) and the remaining bits in Feature Block 2 (FB2).

In an embodiment, the generated feature block file describes byte offsets and ranges of each feature block.

1) <Include>—top level element;

2) <SFTProperties>—an element to describe properties of the SFT;

3) <Size>—child element of <SFTProperties>;

a) "uncompressedSize" attribute—the uncompressed size of the SFT (in bytes);

4) <FeatureBlocks> an element that contains all the feature blocks;

5) <FeatureBlock> an element that describes SFT ranges that compose a feature block;

a) "Id" attribute—a unique identifier for each feature block. Special identifiers are "1" for Feature Block 1, "headers" for the headers section of the SFT, "rest" for FB2 ranges (may or may not overlap with ranges from other feature blocks);

6) <Range> element—describes a range of the SFT file;

a) "start" attribute—the byte offset of the SFT at the start of a range;

b) "end" attribute—the byte length of the range of the SFT from the "start" point;

7) <BlockOffsets> an element with a list of SFT block boundary offsets used in grouping ranges.

An example feature block file can be constructed as:

[0063] - <Include>
[0064] - <SFTProperties>
[0065] <Size uncompressedSize="835094648" />
[0066] </SFTProperties>
[0067] - <FeatureBlocks>
[0068] - <FeatureBlock Id="1">
[0069] <Range start="204067" end="11981919" />
[0070] </FeatureBlock>
[0071] - <FeatureBlock Id="PPTBoot">
[0072] <Range start="204067" end="248251" />

[0073] <Range start="280627" end="322503" />
[0074] <Range start="353292" end="706116" />
[0075] <Range start="744073" end="986927" />
[0076] <Range start="1029287" end="1273955" />
[0077] <Range start="1313912" end="1562661" />
[0078] <Range start="1602624" end="1924266" />
[0079] <Range start="1963453" end="2045614" />
[0080] <Range start="2085228" end="2243224" />
[0081] <Range start="2297883" end="2443943" />
[0082] <Range start="2590571" end="2625587" />
[0083] <Range start="2694005" end="2830682" />
[0084] <Range start="2968433" end="3036813" />
[0085] <Range start="3146682" end="3293060" />
[0086] <Range start="3328730" end="3474671" />
[0087] <Range start="3580464" end="3725426" />
[0088] <Range start="3795853" end="3901408" />
[0089] <Range start="3977902" end="4015809" />
[0090] <Range start="4053487" end="4235249" />
[0091] <Range start="4339574" end="4531157" />
[0092] <Range start="4553359" end="5158786" />
[0093] <Range start="5166128" end="6411455" />
[0094] <Range start="7027074" end="7061894" />
[0095] <Range start="7139796" end="8380187" />
[0096] <Range start="8444473" end="9111029" />
[0097] <Range start="9176150" end="9858844" />
[0098] <Range start="9881769" end="10266383" />
[0099] <Range start="10292235" end="10504713" />
[00100] <Range start="97311557" end="97384042" />
[00101] <Range start="97403803" end="97499001" />
[00102] <Range start="136405556" end="136560702" />
[00103] <Range start="136773354" end="136814911" />
[00104] <Range start="141938750" end="141978515" />
[00105] <Range start="155216667" end="155362436" />
[00106] <Range start="155463116" end="155497983" />

| | |
|---|---|
| [00107] | <Range start="155532321" end="155705283" /> |
| [00108] | <Range start="182677689" end="182693876" /> |
| [00109] | <Range start="195761032" end="195902945" /> |
| [00110] | <Range start="195942140" end="196011926" /> |
| [00111] | <Range start="196158838" end="196218531" /> |
| [00112] | <Range start="196389945" end="196416425" /> |
| [00113] | <Range start="196718552" end="196752580" /> |
| [00114] | <Range start="196865709" end="196902611" /> |
| [00115] | <Range start="197075521" end="197149781" /> |
| [00116] | <Range start="244533657" end="244615029" /> |
| [00117] | <Range start="244853329" end="244901896" /> |
| [00118] | <Range start="244901896" end="244902233" /> |
| [00119] | <Range start="244902233" end="245714332" /> |
| [00120] | <Range start="245749367" end="245822628" /> |
| [00121] | <Range start="245865768" end="246097391" /> |
| [00122] | <Range start="246115343" end="246282295" /> |
| [00123] | <Range start="246837253" end="246959794" /> |
| [00124] | <Range start="247844752" end="247882820" /> |
| [00125] | <Range start="248652949" end="248688064" /> |
| [00126] | <Range start="248975174" end="248998999" /> |
| [00127] | <Range start="249097090" end="249222557" /> |
| [00128] | <Range start="249254075" end="249254333" /> |
| [00129] | <Range start="249254462" end="249476366" /> |
| [00130] | <Range start="249573679" end="249574016" /> |
| [00131] | <Range start="323801211" end="324345503" /> |
| [00132] | <Range start="324525922" end="324639050" /> |
| [00133] | <Range start="324876950" end="324920140" /> |
| [00134] | <Range start="340312491" end="340339898" /> |
| [00135] | <Range start="340464252" end="340526654" /> |
| [00136] | <Range start="340612101" end="340692133" /> |
| [00137] | <Range start="340692465" end="340735042" /> |
| [00138] | <Range start="340777454" end="340907914" /> |
| [00139] | <Range start="341954918" end="342020355" /> |
| [00140] | <Range start="342215987" end="342280725" /> |

[00141] <Range start="359737665" end="359798439" />
[00142] <Range start="359839331" end="360315494" />
[00143] <Range start="360427278" end="360506775" />
[00144] <Range start="360618646" end="360693628" />
[00145] <Range start="360771985" end="360846062" />
[00146] <Range start="360947212" end="361020418" />
[00147] <Range start="361056491" end="361134618" />
[00148] <Range start="361166554" end="361266696" />
[00149] <Range start="361414194" end="361449010" />
[00150] <Range start="361702657" end="361819608" />
[00151] <Range start="361851101" end="361923355" />
[00152] <Range start="362070490" end="362140884" />
[00153] <Range start="362402158" end="362494894" />
[00154] <Range start="362599397" end="362641552" />
[00155] <Range start="362689015" end="362693880" />
[00156] <Range start="362703480" end="362719223" />
[00157] <Range start="362733992" end="362887243" />
[00158] <Range start="362889271" end="362889608" />
[00159] <Range start="362987920" end="363013108" />
[00160] <Range start="363298099" end="363345584" />
[00161] <Range start="363641532" end="363671657" />
[00162] <Range start="366250553" end="366357223" />
[00163] <Range start="366391668" end="366678073" />
[00164] <Range start="376902369" end="376980987" />
[00165] <Range start="377241030" end="377418046" />
[00166] </FeatureBlock>
[00167] - <FeatureBlock Id="WordBoot">
[00168] <Range start="204067" end="322503" />
[00169] <Range start="368694" end="429823" />
[00170] <Range start="466422" end="986927" />
[00171] <Range start="1029287" end="1273955" />
[00172] <Range start="1313912" end="1562661" />
[00173] <Range start="1602624" end="1924266" />
[00174] <Range start="1963453" end="2259079" />

| | |
|---|---|
| [00175] | <Range start="2297883" end="2369947" /> |
| [00176] | <Range start="2408867" end="2443943" /> |
| [00177] | <Range start="2590571" end="2625587" /> |
| [00178] | <Range start="2694005" end="2830682" /> |
| [00179] | <Range start="2934218" end="3005122" /> |
| [00180] | <Range start="3111215" end="3293060" /> |
| [00181] | <Range start="3328730" end="3509740" /> |
| [00182] | <Range start="3580464" end="3725426" /> |
| [00183] | <Range start="3795853" end="3901408" /> |
| [00184] | <Range start="3977902" end="4235249" /> |
| [00185] | <Range start="4269063" end="4531157" /> |
| [00186] | <Range start="4553359" end="5158786" /> |
| [00187] | <Range start="5166128" end="5592027" /> |
| [00188] | <Range start="5673953" end="6284921" /> |
| [00189] | <Range start="6284921" end="6411455" /> |
| [00190] | <Range start="7027074" end="7061894" /> |
| [00191] | <Range start="7139796" end="7869641" /> |
| [00192] | <Range start="7869641" end="8380187" /> |
| [00193] | <Range start="8444473" end="10430095" /> |
| [00194] | <Range start="10452302" end="10504713" /> |
| [00195] | <Range start="54626548" end="54635388" /> |
| [00196] | <Range start="126229955" end="126257523" /> |
| [00197] | <Range start="126287317" end="126539592" /> |
| [00198] | <Range start="134442111" end="134726411" /> |
| [00199] | <Range start="136405556" end="136560702" /> |
| [00200] | <Range start="136773354" end="136814911" /> |
| [00201] | <Range start="141938750" end="141978515" /> |
| [00202] | <Range start="182933255" end="183072795" /> |
| [00203] | <Range start="184220325" end="184255191" /> |
| [00204] | <Range start="195761032" end="195848088" /> |
| [00205] | <Range start="195870789" end="195886107" /> |
| [00206] | <Range start="196158838" end="196218531" /> |
| [00207] | <Range start="196389945" end="196416425" /> |
| [00208] | <Range start="196718552" end="196752580" /> |

[00209] <Range start="261579062" end="261862093" />
[00210] <Range start="266985160" end="266985497" />
[00211] <Range start="269576573" end="270476287" />
[00212] <Range start="270512420" end="271580767" />
[00213] <Range start="271739959" end="272230150" />
[00214] <Range start="272256172" end="272283547" />
[00215] <Range start="272314977" end="272549916" />
[00216] <Range start="272629804" end="272708335" />
[00217] <Range start="272746831" end="272825132" />
[00218] <Range start="273057735" end="273133895" />
[00219] <Range start="273546281" end="273618890" />
[00220] <Range start="273695609" end="273734486" />
[00221] <Range start="273772916" end="273886982" />
[00222] <Range start="274148102" end="274221264" />
[00223] <Range start="274748495" end="274788103" />
[00224] <Range start="275010416" end="275085132" />
[00225] <Range start="275426305" end="275501501" />
[00226] <Range start="275655164" end="275692505" />
[00227] <Range start="275836519" end="275908176" />
[00228] <Range start="275949006" end="275987091" />
[00229] <Range start="276399209" end="276475730" />
[00230] <Range start="276702823" end="276738901" />
[00231] <Range start="277201954" end="277240441" />
[00232] <Range start="277317088" end="277394104" />
[00233] <Range start="277432955" end="277463766" />
[00234] <Range start="277561907" end="277711421" />
[00235] <Range start="277743323" end="277927584" />
[00236] <Range start="277981361" end="278111964" />
[00237] <Range start="278137035" end="278183789" />
[00238] <Range start="278254517" end="278853205" />
[00239] <Range start="278984854" end="278985191" />
[00240] <Range start="340312491" end="340339898" />
[00241] <Range start="340464252" end="340526654" />
[00242] <Range start="357921085" end="357935636" />

| | |
|---|---|
| [00243] | <Range start="358051276" end="358575408" /> |
| [00244] | <Range start="359760333" end="359798439" /> |
| [00245] | <Range start="359839331" end="360004230" /> |
| [00246] | <Range start="360044989" end="360240136" /> |
| [00247] | <Range start="360275076" end="360315494" /> |
| [00248] | <Range start="360350521" end="360506775" /> |
| [00249] | <Range start="360771985" end="360846062" /> |
| [00250] | <Range start="360881842" end="360913958" /> |
| [00251] | <Range start="360947212" end="360982352" /> |
| [00252] | <Range start="361095889" end="361134618" /> |
| [00253] | <Range start="361166554" end="361304890" /> |
| [00254] | <Range start="361414194" end="361449010" /> |
| [00255] | <Range start="361594860" end="361632392" /> |
| [00256] | <Range start="361702657" end="361923355" /> |
| [00257] | <Range start="362070490" end="362140884" /> |
| [00258] | <Range start="362217656" end="362253231" /> |
| [00259] | <Range start="362329679" end="362494894" /> |
| [00260] | <Range start="362534152" end="362568609" /> |
| [00261] | <Range start="362599397" end="362641552" /> |
| [00262] | <Range start="362689015" end="362693880" /> |
| [00263] | <Range start="362703480" end="362719223" /> |
| [00264] | <Range start="362733992" end="362748884" /> |
| [00265] | <Range start="362782121" end="362834648" /> |
| [00266] | <Range start="362887243" end="362889192" /> |
| [00267] | <Range start="362889271" end="362889608" /> |
| [00268] | <Range start="362987920" end="363013108" /> |
| [00269] | <Range start="363272666" end="363345584" /> |
| [00270] | <Range start="363641532" end="363671657" /> |
| [00271] | <Range start="366250553" end="366357223" /> |
| [00272] | <Range start="366391668" end="366678073" /> |
| [00273] | <Range start="376902369" end="376980987" /> |
| [00274] | <Range start="377241030" end="377418046" /> |
| [00275] | </FeatureBlock> |
| [00276] | - <FeatureBlock Id="XlBoot"> |

[00277] <Range start="204067" end="322503" />
[00278] <Range start="368694" end="784631" />
[00279] <Range start="824708" end="986927" />
[00280] <Range start="1029287" end="1273955" />
[00281] <Range start="1313912" end="1562661" />
[00282] <Range start="1602624" end="1924266" />
[00283] <Range start="1963453" end="2045614" />
[00284] <Range start="2085228" end="2243224" />
[00285] <Range start="2259079" end="2369947" />
[00286] <Range start="2408867" end="2443943" />
[00287] <Range start="2590571" end="2625587" />
[00288] <Range start="2694005" end="2830682" />
[00289] <Range start="2902363" end="2934218" />
[00290] <Range start="2968433" end="3005122" />
[00291] <Range start="3075085" end="3111215" />
[00292] <Range start="3146682" end="3293060" />
[00293] <Range start="3328730" end="3439685" />
[00294] <Range start="3509740" end="3543669" />
[00295] <Range start="3580464" end="3725426" />
[00296] <Range start="3795853" end="3901408" />
[00297] <Range start="3939443" end="4015809" />
[00298] <Range start="4053487" end="4235249" />
[00299] <Range start="4339574" end="4531157" />
[00300] <Range start="4553359" end="5158786" />
[00301] <Range start="5166128" end="5592027" />
[00302] <Range start="5673953" end="6284921" />
[00303] <Range start="6284921" end="6411455" />
[00304] <Range start="7027074" end="7061894" />
[00305] <Range start="7139796" end="8380187" />
[00306] <Range start="8444473" end="9111029" />
[00307] <Range start="9176150" end="9858844" />
[00308] <Range start="9881769" end="10430095" />
[00309] <Range start="10452302" end="10504713" />
[00310] <Range start="126914966" end="127011268" />

| | |
|---|---|
| [00311] | <Range start="127107297" end="127137976" /> |
| [00312] | <Range start="127217503" end="127296691" /> |
| [00313] | <Range start="127311698" end="127338310" /> |
| [00314] | <Range start="135919312" end="136271250" /> |
| [00315] | <Range start="136310537" end="136687306" /> |
| [00316] | <Range start="136729862" end="136857763" /> |
| [00317] | <Range start="136938639" end="137063679" /> |
| [00318] | <Range start="137224144" end="137348409" /> |
| [00319] | <Range start="137435906" end="137523428" /> |
| [00320] | <Range start="137565471" end="137935913" /> |
| [00321] | <Range start="138351880" end="138435297" /> |
| [00322] | <Range start="138563867" end="138607381" /> |
| [00323] | <Range start="138636069" end="138672143" /> |
| [00324] | <Range start="141938750" end="141978515" /> |
| [00325] | <Range start="142140584" end="142222349" /> |
| [00326] | <Range start="143104683" end="143185599" /> |
| [00327] | <Range start="144979666" end="145050361" /> |
| [00328] | <Range start="145171064" end="145251576" /> |
| [00329] | <Range start="145265917" end="145274645" /> |
| [00330] | <Range start="145275826" end="145275955" /> |
| [00331] | <Range start="145311034" end="145392146" /> |
| [00332] | <Range start="145762649" end="145763415" /> |
| [00333] | <Range start="155216667" end="155326527" /> |
| [00334] | <Range start="155463116" end="155497983" /> |
| [00335] | <Range start="155532321" end="155705283" /> |
| [00336] | <Range start="182677689" end="182693876" /> |
| [00337] | <Range start="196158838" end="196218531" /> |
| [00338] | <Range start="196389945" end="196416425" /> |
| [00339] | <Range start="196718552" end="196752580" /> |
| [00340] | <Range start="197021463" end="197052003" /> |
| [00341] | <Range start="340312491" end="340339898" /> |
| [00342] | <Range start="340464252" end="340526654" /> |
| [00343] | <Range start="340612101" end="340661712" /> |
| [00344] | <Range start="340719206" end="340735042" /> |

[00345]  <Range start="344293062" end="344357667" />
[00346]  <Range start="359760333" end="359798439" />
[00347]  <Range start="359839331" end="360004230" />
[00348]  <Range start="360044989" end="360084115" />
[00349]  <Range start="360124236" end="360240136" />
[00350]  <Range start="360275076" end="360506775" />
[00351]  <Range start="360771985" end="360846062" />
[00352]  <Range start="360947212" end="360982352" />
[00353]  <Range start="361166554" end="361266696" />
[00354]  <Range start="361414194" end="361449010" />
[00355]  <Range start="361487575" end="361520518" />
[00356]  <Range start="361702657" end="361887590" />
[00357]  <Range start="361961203" end="361998069" />
[00358]  <Range start="362033514" end="362140884" />
[00359]  <Range start="362329679" end="362494894" />
[00360]  <Range start="362599397" end="362641552" />
[00361]  <Range start="362689015" end="362693880" />
[00362]  <Range start="362703480" end="362748884" />
[00363]  <Range start="362889271" end="362889608" />
[00364]  <Range start="362987920" end="363013108" />
[00365]  <Range start="363298099" end="363345584" />
[00366]  <Range start="363641532" end="363642928" />
[00367]  <Range start="376902369" end="376980987" />
[00368]  <Range start="377241030" end="377418046" />
[00369]  </FeatureBlock>
[00370]  - <FeatureBlock Id="rest">
[00371]  <Range start="11981919" end="439266642" />
[00372]  </FeatureBlock>
[00373]  - <FeatureBlock Id="headers">
[00374]  <Range start="0" end="204067" />
[00375]  </FeatureBlock>
[00376]  </FeatureBlocks>
[00377]  - <BlockOffsets>
[00378]  - <![CDATA[

[00379] 1029287, 2045614, 3075085, 4088046, 5120792, 6155685, 7172917, 8210866, 9241705, 10266383, 11306122, 12332763, 13379741, 14406010, 15441446, 16489815, 17519673, 18561200, 19571499, 20596702, 21643489, 22690321, 23734797, 24771601, 25815794, 26860345, 27908203, 28952603, 29936318, 30919513, 31961656, 32945088, 33928666, 34912381, 35896087, 36879763, 37863258, 38846944, 39830659, 40814374, 41798089, 42843827, 43827542, 44841915, 45867474, 46895796, 47914121, 48958377, 49966094, 51013598, 52061491, 53105822, 54089537, 55133644, 56171992, 57216129, 58199661, 59242564, 60226279, 61209956, 62193671, 63238718, 64282707, 65329210, 66377582, 67421831, 68466008, 69513469, 70497184, 71541042, 72524757, 73545422, 74529137, 75512852, 76496567, 77480239, 78463954, 79447652, 80431180, 81414895, 82398610, 83443857, 84451362, 85495312, 86541593, 87585449, 88569164, 89573840, 90557555, 91541270, 92524985, 93508695, 94492102, 95475815, 96521263, 97550965, 98582348, 99567746, 100551461, 101535176, 102518891, 103502606, 104486321, 105470036, 106480277, 107493604, 108532323, 109563026, 110600868, 111609318, 112654374, 113698513, 114744592, 115728298, 116771061, 117754776, 118767801, 119751471, 120735186, 121718742, 122702434, 123686124, 124669839, 125714274, 126714912, 127739716, 128783411, 129814853, 130814764, 131852114, 132882121, 133896348, 134932894, 135955919, 136975607, 138022036, 139038853, 140072910, 141085471, 142099490, 143145704, 144156053, 145191331, 146227056, 147266096, 148314236, 149359008, 150377244, 151413607, 152446423, 153470827, 154515103, 155563398, 156589826, 157637042, 158663979, 159703648, 160717700, 161745607, 162776717, 163817990, 164855914, 165896155, 166932980, 167980721, 169009830, 170045244, 171067785, 172091633, 173119516, 174129660, 175170210, 176218274, 177252693, 178275948, 179315242, 180339976, 181379646, 182383415, 183407005, 184430468, 185467758, 186515020, 187535282, 188570312, 189607011, 190638427, 191678197, 192661842, 193709858, 194754696, 195800992, 196826777, 197869667, 198909533, 199941497, 200982574, 202012447, 203051439, 204078612, 205124131, 206163315, 207204219, 208243616, 209252325, 210277660, 211318628, 212366788, 213392596, 214383570, 215372926, 216387922, 217418666, 218434278, 219470741, 220462335, 221476920, 222523755, 223556304, 224590192, 225615359, 226653417, 227685504, 228727382, 229772303, 230811439, 231822996, 232822395, 233850130, 234887288, 235930497, 236968319, 238011055, 239044710, 240085386, 241117565, 242154381, 243170932, 244218736, 245236707, 246282295, 247306431, 248337049, 249383885, 250388837, 251422770, 252460442, 253481474, 254518683, 255552797, 256568867, 257600888, 258592506, 259618186, 260657132, 261694838, 262742945, 263777144, 264810952, 265824097, 266825907, 267871646, 268902939, 269909341, 270947110, 271979155, 273020248, 274055424, 275085132, 276133068, 277167365, 278210333, 279257722, 280257839, 281250529, 282253631, 283270770, 284292482, 285305230, 286307075, 287326039, 288309754, 289330179, 290352331, 291396226, 292413847, 293435226, 294474048, 295490918, 296537338, 297546853, 298569924, 299591489, 300596531, 301622329, 302660162, 303675209, 304713439, 305743299, 306783694, 307821066, 308828187, 309859869, 310884172, 311896716, 312941652, 313989248, 315009756, 316047815, 317079609, 318104738, 319143451, 320171093, 321169004, 322217104, 323229672, 324274061, 325296252, 326326181, 327354263, 328382203, 329429325, 330452738, 331477442, 332508733, 333535445, 334557716, 335597329, 336617461, 337663247, 338658213, 339659716, 340692465, 341692921, 342736014, 343771980, 344813629, 345854676, 346896850, 347942085, 348989770, 350036863, 351067220, 352106787, 353131298, 354172595, 355200789, 356231434, 357270089, 358306442, 359339932, 360388098, 361414194, 362456757, 363504505, 364542898, 365582174, 366619105, 367642743, 368661366, 369701870, 370729790, 371766448, 372807596, 373848880, 374863147, 375888894, 376902369, 377936959, 378950894, 379971060, 381018043, 382056313, 383085691, 384127429, 385164703, 386211245, 387212899, 388231431, 389259092, 390292599, 391332356, 392375290, 393388812, 394436686, 395472400, 396510497, 397532159, 398578623, 399597994, 400635393, 401680853, 402709282, 403755470, 404803494, 405848750, 406876699, 407900031, 408930303, 409966161, 411014161, 412039031, 413062586, 414075784, 415109038, 416152226, 417184312, 418197017, 419237424, 420269008, 421311463, 422326422, 423363847, 424402599, 425404397, 426430890, 427478670, 428522226, 429562167, 430599378, 431633057, 432666047, 433710832, 434734083, 435756472, 436802711, 437848721, 438849024,

[00380] ]]>

[00381] </BlockOffsets>

[00382] </Include>

In one embodiment, the forge component 118 uses the feature block file generated by the encoder 120 and the faux feature block authoring file as inputs to generate the faux feature block file which can be hosted on one or more virtualization servers along with an optimized virtual application image (e.g.. optimized SFT). The faux feature block authoring file contains scenario and feature block mappings for the optimized virtual package 106. For example, an author can create the faux feature block authoring file to include application use and feature scenarios and associated feature block mappings for a suite of virtualized applications (e.g., business productivity suite).

An XML schema description of an embodiment for a faux feature block authoring file and the faux feature block file includes the following:

1) <FFBXML> top level element
   a) "sft" attribute—name of the SFT to which this file applies
   b) "start" attribute—an identifier for the default scenario to download
   c) "eof" attribute—byte offset of the end of the SFT file In the example case of FFB.XML, the schema from FeatureBlocks.XML is used in part:

2) <Scenario> elements describe what feature blocks or other scenarios compose it (e.g., a word processing scenario could be composed of Feature Block 1, boot feature block, and the "proofing" scenario composed of spelling and grammar feature blocks).
   a) "Id" attribute is the unique name for this scenario An example faux feature block authoring file can be constructed as follows:

```
- <FFBXML sft="$(var.SFTName)" start="default" eof="$(var.SFTEOF)">
    <?include "featureblocks.xml"?>
  - <Scenario Id="proofing">
      <FeatureBlock Id="spell" />
      <FeatureBlock Id="grammar" />
    </Scenario>
  - <Scenario Id="word">
      <FeatureBlock Id="WordBoot" />
      <Scenario Id="proofing" />
    </Scenario>
  - <Scenario Id="ppt">
      <FeatureBlock Id="PPTBoot" />
      <FeatureBlock Id="pivot" />
      <Scenario Id="proofing" />
    </Scenario>
  - <Scenario Id="xl">
      <FeatureBlock Id="ExcelBoot" />
      <FeatureBlock Id="graph" />
    </Scenario>
    <FeatureBlock Id="rest" />
  - <Scenario Id="default">
      <Scenario Id="word" />
      <Scenario Id="ppt" />
      <Scenario Id="xl" />
      <FeatureBlock Id="rest" />
    </Scenario>
  </FFBXML>
```

An example faux feature block file can be generated to include the following:

```
- <FFBXML sft="EssentialsC2R.en-us_14.0.3902.1000.sft" start="default" eof="402468968">
  - <SFTProperties>
      <Size uncompressedSize="807649927" />
    </SFTProperties>
  - <FeatureBlocks>
  - <FeatureBlock FBID="ExcelBoot">
      <Range start="121428623" end="125664690" />
      <Range start="240845333" end="243024923" />
    </FeatureBlock>
  - <FeatureBlock FBID="PPTBoot">
      <Range start="119299390" end="126713403" />
      <Range start="231225287" end="248387271" />
      <Range start="351176261" end="394199014" />
    </FeatureBlock>
  - <FeatureBlock FBID="pivot">
      <Range start="229079783" end="236547092" />
      <Range start="453946758" end="456077928" />
    </FeatureBlock>
  - <FeatureBlock FBID="WordBoot">
      <Range start="384617817" end="387823015" />
      <Range start="389955108" end="393129834" />
      <Range start="403823120" end="408154754" />
    </FeatureBlock>
  - <FeatureBlock FBID="spell">
      <Range start="5137043" end="8335060" />
      <Range start="12706611" end="16028694" />
    <FeatureBlock>
  - <FeatureBlock FBID="grammar">
      <Range start="161862681" end="168267703" />
      <Range start="264407584" end="271874661" />
    </FeatureBlock>
  - <FeatureBlock FBID="graph">
      <Range start="3013667" end="5137043" />
      <Range start="7261426" end="10482074" />
      <Range start="233330619" end="236547092" />
    </FeatureBlock>
  - <FeatureBlock Id="1">
      <Range start="203669" end="11447930" />
    </FeatureBlock>
  - <FeatureBlock Id="rest">
```

-continued

```
        <Range start="11447930" end="402468968" />
       </FeatureBlock>
     - <FeatureBlock Id="headers">
        <Range start="0" end="203669" />
       </FeatureBlock>
      </FeatureBlocks>
    - <BlockOffsets>
     - <![CDATA[ 1021778, 2042904, 3065180, 4088352, 5118298, 6150980,
7191266, 8224297, 9265609, 10313239, 11361030, 12403073, 13447846, 14490932,
15538915, 16568148, 17596447, 18632890, 19664840, 20709161, 21753697, 22801814,
23846214, 24829929, 25813124, 26856745, 27840349, 28823889, 29807604, 30791275,
31774969, 32758553, 33742257, 34725972, 35709687, 36693402, 37739761, 38723476,
39719709, 40755299, 41799021, 42846293, 43894573, 44943009, 45987685, 46974440,
48010564, 49052717, 50098024, 51144733, 52128448, 53112125, 54095840, 55141910,
56183810, 57227770, 58262266, 59306290, 60350555, 61334008, 62377866, 63361581,
64344745, 65365961, 66349676, 67333391, 68317063, 69300778, 70284493, 71268191,
72251719, 73235434, 74219149, 75264396, 76269364, 77313452, 78360989, 79404845,
80388225, 81380793, 82364508, 83348223, 84331938, 85315643, 86299026, 87282741,
88266456, 89250171, 90294994, 91315937, 92350671, 93393551, 94377266, 95360981,
96344696, 97328411, 98312126, 99335410, 100367463, 101373348, 102413855,
103401111, 104436003, 105437790, 106482301, 107526713, 108510259, 109553022,
110536737, 111550699, 112534357, 113518072, 114501787, 115485460, 116469015,
117452725, 118436430, 119482418, 120518108, 121556267, 122592908, 123586556,
124592761, 125640974, 126684675, 127732434, 128769613, 129807154, 130845994,
131872580, 132897020, 133929764, 134952322, 135993217, 137003932, 138046508,
139072256, 140077310, 141109309, 142140488, 143162282, 144197152, 145239767,
146252086, 147268099, 148291188, 149334754, 150354416, 151374409, 152394917,
153427798, 154450320, 155491276, 156537262, 157567837, 158587020, 159592848,
160619263, 161658551, 162680821, 163713588, 164725024, 165770416, 166771249,
167795968, 168840730, 169870137, 170890860, 171932761, 172946365, 173988581,
175025385, 176054540, 177087712, 178129269, 179169356, 180203469, 181239064,
182274790, 183309164, 184311020, 185294666, 186342227, 187387364, 188420759,
189468593, 190497865, 191533548, 192551233, 193587938, 194605166, 195649606,
196684257, 197713770, 198751879, 199783312, 200818603, 201857003, 202880075,
203921434, 204957301, 205999182, 207042363, 208068478, 209107245, 210127830,
211174366, 212200113, 213248472, 214292016, 215327090, 216354835, 217390457,
218410008, 219449437, 220474622, 221482711, 222512878, 223546580, 224573231,
225592995, 226641349, 227670637, 228717910, 229745671, 230792496, 231827256,
232874509, 233897917, 234929069, 235956665, 236988146, 238031078, 239030827,
240060311, 241098278, 242139083, 243176399, 244220524, 245247473, 246282439,
247318230, 248358417, 249406957, 250403483, 251433913, 252480574, 253494943,
254542166, 255581998, 256617015, 257657629, 258701540, 259724847, 260753159,
261786202, 262832733, 263858000, 264903256, 265951322, 266978560, 268018859,
269011614, 270060012, 271081264, 272116278, 273111379, 274100969, 275084605,
276068320, 277088168, 278135247, 279133198, 280157228, 281167159, 282157641,
283181622, 284219884, 285261735, 286293775, 287341608, 288368488, 289386921,
290424784, 291443480, 292453346, 293478792, 294518538, 295559355, 296588667,
297629521, 298658181, 299661764, 300697335, 301734380, 302770016, 303801058,
304818352, 305858942, 306885198, 307921195, 308959680, 309995539, 311041775,
312060400, 313092045, 314119412, 315141560, 316171660, 317218684, 318214325,
319198001, 320195789, 321213627, 322254870, 323274689, 324310023, 325356283,
326399705, 327445729, 328486415, 329518547, 330565509, 331602802, 332644202,
333684794, 334726091, 335770673, 336807309, 337853097, 338900494, 339938814,
340964034, 341980934, 343002076, 344025216, 345061913, 346109734, 347152121,
348167758, 349158858, 350197066, 351245010, 352260705, 353288857, 354337018,
355351970, 356395430, 357411199, 358439122, 359451204, 360476895, 361506092,
362528851, 363568857, 364579109, 365614995, 366657603, 367684730, 368672262,
369672807, 370683030, 371724040, 372756017, 373790063, 374809900, 375836785,
376856717, 377896688, 378941924, 379983737, 381028504, 382054195, 383091103,
384106429, 385139267, 386176906, 387200137, 388245271, 389291411, 390308523,
391353478, 392393088, 393433687, 394476447, 395519361, 396553085, 397584409,
398632719, 399668490, 400687609, 401717348,
       ]]>
      </BlockOffsets>
    - <Scenario id="word">
       <FeatureBlock id="WordBoot" />
       <Scenario id="proofing" />
      </Scenario>
    - <Scenario id="proofing">
       <FeatureBlock id="spelling" />
       <FeatureBlock id="grammar" />
      </Scenario>
    - <Scenario id="ppt">
       <FeatureBlock id="PPTBoot" />
       <FeatureBlock id="pivot" />
       <Scenario id="proofing" />
      </Scenario>
    - <Scenario id="xl">
       <FeatureBlock id="ExcelBoot" />
       <FeatureBlock id="graph" />
```

```
    </Scenario>
  - <Scenario id="default">
    <FeatureBlock id="1" />
    <Scenario id="word" />
    <Scenario id="ppt" />
    <Scenario id="xl" />
    <FeatureBlock id="rest" />
    </Scenario>
  </FFBXML>
```

As described above, in one embodiment, the faux feature block file and the optimized SFT file can be hosted on a serving system and accessed by client computing devices using a client virtualization handler 108 including virtualization drivers and other software. For example, a user can install the client virtualization handler 108 on an associated computing device to pull down bits and byte ranges of the optimized SFT file based in part on a user action or actions using an Internet connection.

As described further below, and in accordance with an embodiment, bits and/or byte ranges of an optimized virtual application image can be downloaded to the client computing device as the client virtualization handler 108 as part of an installation process. In one embodiment, a bootstrapping component can be used to stream feature blocks (including Feature Block 1 and beyond) to a temporary location or cache 114 (e.g., pseudo cache) of device memory. Once the client virtualization handler 108 is installed, and a virtual application is published to the machine, virtual application bits are first loaded from the temporary cache 114 to the virtual application cache 110 and then the client virtualization handler 108 switches online to download the remainder of the bits. The optimization reduces the time required for the user to begin using a virtual application or associated feature.

Traditionally, virtual applications require Feature Block 1 to be downloaded before starting any virtual application, followed by Feature Block 2 in the background. Why should the user be blocked waiting for spreadsheet application bits when wanting to use a word processing application or feature? Why should the remainder of the spreadsheet application bits be coming down next in the background stream when the user is using the word processing application and is more likely to hit a code page of the word processing application that has not yet been downloaded?

In an embodiment, the client virtualization handler 108 includes a download manager or component that handles byte range requests for features of an optimized virtual application image (e.g., SFT range requests). The download manager consumes the faux feature block file (e.g., FFB.XML) that was produced alongside the optimized virtual application image to determine the scenarios and/or feature blocks, and to generate the corresponding image offset and/or range mappings of the optimized virtual package. In one embodiment, the download manager maintains a priority queue of feature block requests for download and prevents double-downloading any range from overlapping feature blocks.

In one embodiment, a default scenario of a faux feature block file lists a default ordering for blocks to be downloaded. However, as discussed above and further below, user actions can result in the download manager altering feature block and/or byte range ordering in the priority queue. For example, if a word processing application is booted, the download manager can push the word processing boot feature block to the top of the list (pushing down what may have already been there) for immediate download. Additionally, feature blocks and/or byte ranges related to the word processing application can be pushed on the priority queue after the boot, like spelling and grammar features for example.

In an embodiment, the download manager can operate to push new scenarios or feature block requests on to the queue and/or wait for a feature block ID to be complete. For example, when a spreadsheet application is booted, the download manager pushes a spreadsheet scenario (e.g., boot and related spreadsheet application feature blocks) to the priority queue. As another example, a scenario can also be used to block the spreadsheet application boot until the associated boot feature block is completely downloaded.

Correspondingly, the download manager can operate to reduce OOS requests by playing feature blocks before the associated code is requested. In some situations, OOS requests occur, such when a user invokes a feature which is not mapped to a feature block or may be mis-prioritized. The download manager can efficiently resolve OOS requests by detecting bandwidth and other download constraints, and yielding bandwidth to OOS activity in order to have a virtual application return to responsiveness by throttling and/or blocking an interfering background stream. When OOS calls subside, the download manager can resume with the background stream.

Figure 2:
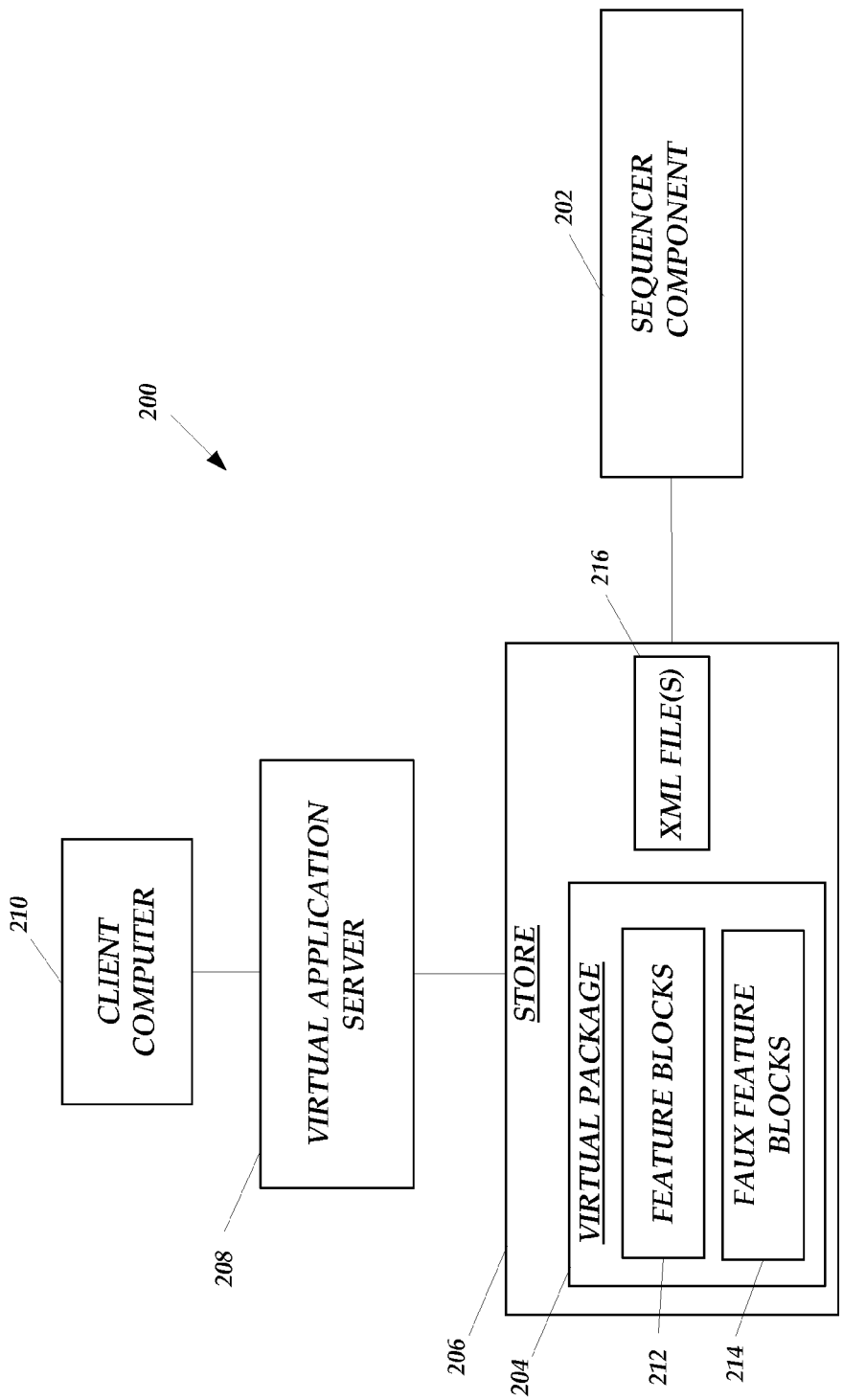
FIG. 2 depicts a block diagram of an exemplary system configured to provide a virtual application environment.

FIG. 2 is a block diagram of an exemplary virtual application environment 200 that includes virtual application streaming functionality, but is not so limited. Components of the environment 200 of an embodiment can be configured to provide and use a virtual package which can include Open Software Description (OSD) files, icon files, and, a softricity file type assigned to an image file (SFT file), but are not so limited. The SFT file includes the bits for an associated virtualized product or application. An OSD file can be described as an extensible markup language (XML) file that describes how to load a virtual application.

Each virtual application can include a corresponding OSD file. When a user clicks on a shortcut for a virtual application, an associated OSD file is used to start the virtual application. Correspondingly, an OSD file can be used to describe an entry point to start an associated virtual application. The number of OSD files and icon files included in a virtual package correspond to the number of applications included in the virtual package. For example, a virtual package including a virtualized word processing application, virtualized spreadsheet application, and a virtualized presentation application will include all of the icons that each of those applications use and three OSD files.

In an embodiment, virtual application environment 200 includes a sequencer component 202, a virtual package 204, a store 206, a virtual application server 208, and a client computer 210, but is not so limited. The sequencer component 202 can operate to create a virtual package 204 for use by one or more client computers 210, such as a desktop, laptop, handheld, and/or other computing device.

Virtualized application data and other information can be stored in the store 206 and accessed when providing and using aspects of the virtual package 204. The store 206 can be configured as a dedicated storage or other repository, such as a dedicated server for example. For example, the store 104 can be used to store virtualization information including records, applications, configuration details, licensing data, security details, reporting information, logging information, and other virtualization information.

The virtual application server 208 (also referred to as server 208) can be configured to handle requests for virtual applications and/or services, including specific application functions and/or services, when providing application data to a consuming client. For example, the server 208 can host a virtual business productivity application suite, and a user can use the client computer 210 (e.g., client virtualization handler) to interact with and request features of one or more virtualized applications.

In an embodiment, the server 208 can operate to communicate a number of bits and/or byte ranges associated with one or more feature blocks to the client computer 210 over a network. For example, the server 208 can operate to provide application data and code in blocks or chunks over a distributed computing network, such as the Internet, to a requesting client. The client computer 210 can include a virtual application reader or handler that can use communicated application data and associated bits when presenting a virtualized application or feature to an end-user.

With continuing reference to FIG. 2, the sequencer component 202 can be configured to create virtual packages, including virtualized application images or files, for use by one or more clients, but is not so limited. For example, the sequencer component 202 can generate a number of feature blocks, including variable sizes, which contain data and other information associated with a particular application function or functionality. For example, the size of a feature block may be determined based on a memory configuration, bandwidth, load, and other operational considerations.

The sequencer component 202 can be configured to create virtualized applications and suites of applications, such as virtualized database applications, virtualized word processing applications, virtualized email applications, virtualized spreadsheet applications, and other virtualized applications. A virtualized application can be configured to operate independent of an operating system (OS) and any other applications on the client computer 210. Additionally, the sequencer component 202 can be used to create applications patches and updates. The sequencer component 202 can be executed using a dedicated computing device or system, but is not so limited. In another embodiment, the functionality of the sequencer component 202 can be included with another component of the environment 200, such as part of server 208 for example.

The sequencer component 202 can be configured to provide registry settings, dynamic link libraries (DLLs), initialization files, and other features which can be included as part of the virtual package 204. The sequencer component 202 can be further configured to define and create a number of feature blocks 212, wherein certain feature blocks, or portions thereof, can be consumed or communicated based in part on a current need, action, and/or operation. The sequencer component 202 can compile and provide one or more feature blocks 212, including blocks and/or byte ranges of code, to the client computer 210.

In one embodiment, the sequencer component 202 can be configured to compile a code block and associated bits that will be used to launch and provide a one or more virtualized applications. In one embodiment, a base or un-optimized FB1 can be described as a set of blocks required before any virtual application may start, and FB2 can be described as all of the other blocks and information. In certain embodiments, every code block in a virtual application image (e.g., SFT) can be included in FB1 and/or FB2.

For example, the sequencer component 202 can be used to provide a first feature block (FB1) which includes number of associated blocks defining essential code and bits required to boot and launch a virtualized application. Continuing with the example, the sequencer component 202 can also provide a second feature block (FB2) and/or other features blocks which can include any remaining bits or blocks to provide further application functionality other than booting and launching operations. As one example, bits associated with pivot table operations of a spreadsheet application can be stored in the second feature block, since the pivot table bits may not be required to launch the spreadsheet application. The bits associated with the pivot table operations can be provided on demand in accordance with a spreadsheet scenario when a pivot operation occurs.

Faux feature blocks 214 can be used to identify blocks of data or particular bits that are directed to a particular application, scenario, feature, and/or functionality. For example, four different faux feature blocks may be used respectively for features of a spreadsheet application, a word processing application, a database application, and an email application. One or more faux feature blocks 214 of an embodiment can include a list of data, metadata, and/or other information that the client computer 210 can use to provide an application or certain functionality. In one embodiment, a faux feature block can be used to define one or more data blocks and/or byte ranges that need to be downloaded before executing a particular scenario, command, or other operation. For example, a faux feature block may refer to parts of another feature block to be associated with a particular operation required by a user.

Additionally, faux feature blocks 214 can be used to prioritize application downloads and minimize OOS bit requests. For example, a faux feature block may include a mapping which points to particular blocks of FB1 and/or FB2 that can be used when prioritizing bit downloads. The faux feature blocks 214 allow for a dynamic reprioritization of blocks at run time. For example, a virtual spreadsheet application uses a spd.dll file to boot, whereas the other virtual applications do not require the spd.dll file. By including the spd.dll file in a virtual spreadsheet application boot faux feature block, a download penalty does not extend to the other applications that do not need the spd.dll.

Faux feature blocks 214 can also include redundant data blocks and/or instructions or directives. For example, the sequencer component 202 may define two faux feature blocks, faux feature block A and faux feature block B. Rather than sharing a single block of code, faux feature blocks A and B may include the same code that different applications require to launch (e.g., .dll files). Correspondingly, the same data or code block can be included in multiple faux feature blocks. In one embodiment, faux feature blocks 214 can be included as part of the data structure of the feature blocks 212.

The sequencer component 202 can include one or more handling components or handlers that can be configured to extract information from one or more data structures (e.g., XML files). The extracted information can be used to generate the virtual package 204. In one embodiment, the can use a project creation (PC) component when creating a virtual package 204 from scratch. The PC component can be configured to create an empty virtual package, open an existing virtual package, add package details, remove package details, update package details, and/or save and re-save a virtual package, but is not so limited. In an embodiment, the PC component can be configured to use an XML file which can include details associated with a project, including new and existing projects. In one embodiment, the PC component can be configured to read a package details (PD) XML file which describes certain package details when creating a new empty project or editing details of an existing project.

The sequencer component 202 of an embodiment can also include a machine change (MC) component that can be configured to provide machine-related changes to a virtual package 204, such as changes made to aspects of a computing device at run-time or during set-up. For example, the MC component can be used to add information to a virtual package 204 associated with changes to files, folders, registries, and/or properties of items in the virtual package 204. The MC component can also be configured to remove machine changes and/or modify properties associated with certain machine changes.

In an embodiment, the MC component can be configured to use a data structure (e.g., XML) which describes certain machine changes when performing operations associated with the creation of a virtual package 204. In one embodiment, the MC component can be used to parse XML which describes all machine changes associated with an installation process. The parsed XML can be used to add and remove files, folders, and registries as part of the creation of a virtual package 204.

The sequencer component 202 of an embodiment can also include an optimization component that can be configured to generate optimization data (e.g., using one or more XML files) to provide feature block information for inclusion in a virtual package 204. The XML file or files can include information associated with a number and arrangement of feature blocks 212 and faux feature blocks 214. In an embodiment, the optimization component can be configured to operate on an existing or pre-existing virtual image and an XML file describing faux feature blocks 214 to apply optimization data to files and folders in a virtual image. The optimization component can also be configured to partition file blocks within the virtual package 204 into one or more feature blocks, such as a first feature block, a second feature block, and one or more faux feature blocks. For example, the optimization component can partition blocks between FB1 and FB2 by marking each block with an associated FB number.

Feature blocks 212 and faux feature blocks 214, can be used to provide a faster download mechanism (Play) than page faults (e.g., OOS operations). For example, a first feature block (e.g., FB1) can be downloaded using a single Play request before booting any application. Feature blocks 212 and faux feature blocks 214 can be used to improve boot and feature performance over slower networks by using more efficient Play requests when launching an application or when launching a resource-intensive feature within an application. One or more faux feature blocks 214 can be used to download the optimal set of bits required to launch an application or feature, thereby providing an intelligent, predictable user-interface (UI) during the download.

A faux feature block 214 can be configured to be downloaded as a feature block, but may not be implemented as a true feature block. Examples of faux feature blocks include a word processing application boot, a spreadsheet application boot, English proofing files, Japanese input method editor (IME) files, application scenarios and use mappings, etc. In one embodiment, multiple faux feature blocks can include the same or similar data. Data associated with one or more faux feature blocks can be stored in a file within a virtual package 204, such as with a virtual application image. The client computer 210 can include functionality to read a virtual application image and use the information in the file to request specific parts of the image to be downloaded with a single Play request before starting an application or feature.

The sequencer component 202 of an embodiment can use a number of XML files 216 when creating a virtual package 204. In an embodiment, a MCXML file can be input to the sequencer component 202 and used to generate a virtual package 204, including one or more virtual application images. The MC component can use aspects of the MCXML file as part of creating a virtual package 204. For example, the MCXML file can be used to describe changes to a machine that an installation would have made.

In one embodiment, a MCXML file can be defined according to the schema below.

```
<?xml version="1.0" encoding="utf-8"?>
<xs:schema          xmlns="http://tempuri.org/MachineChanges.xsd"
xmlns:xs="http://www.w3.org/XMLSchema">
    <xs:element name="MachineChanges">
     <xs:complexType>
      <xs:sequence>
       <xs:element name="FileSystem" maxOccurs="1" minOccurs="1">
        <xs:complexType>
         <xs:choice minOccurs="0" maxOccurs="unbounded">
          <xs:element name="File">
           <xs:complexType>
            <xs:sequence>
             <xs:element name="Source">
              <xs:complexType>
               <xs:sequence>
                <xs:element     name="SourceFolder"     type="xs:string"
maxOccurs="1" />
                <xs:element     name="SourceName"      type="xs:string"
maxOccurs="1" />
                <xs:element     name="SourceCabKey"    type="xs:string"
maxOccurs="1" />
                <xs:element     name="SourceCabFile"   type="xs:string"
maxOccurs="1">
               </xs:element>
              </xs:sequence>
             </xs:complexType>
            </xs:element>
```

```
                <xs:element name="Target">
                  <xs:complexType>
                    <xs:sequence>
                      <xs:element     name="TargetName"     type="xs:string"
maxOccurs="1" />
                      <xs:element     name="TargetFolder"   type="xs:string"
maxOccurs="1" />
                    </xs:sequence>
                  </xs:complexType>
                </xs:element>
                <xs:element name="FileAttributes" type="xs:int" />
                <xs:element name="FileSize" type="xs:int" />
                <xs:element name="SoftricityFileType" type="xs:string" />
                <xs:element name="Permanent" type="xs:boolean" />
                <xs:element name="Override" type="xs:boolean" />
              </xs:sequence>
              <xs:attribute name="Remove" type="xs:boolean" default="0" />
            </xs:complexType>
          </xs:element>
        </xs:choice>
      </xs:complexType>
    </xs:element>
    <xs:element name="Registry" maxOccurs="1" minOccurs="1">
      <xs:complexType>
        <xs:choice minOccurs="0" maxOccurs="unbounded">
          <xs:element name="KeyAction">
            <xs:complexType>
              <xs:sequence>
                <xs:element name="Key" type="xs:string" />
                <xs:element name="Name" type="xs:string" />
                <xs:element name="Value">
                  <xs:complexType>
                    <xs:simpleContent>
                      <xs:extension base="xs:string">
                        <xs:attribute     name="ValueType"    type="xs:string"
default="REG_SZ" />
                      </xs:extension>
                    </xs:simpleContent>
                  </xs:complexType>
                </xs:element>
              </xs:sequence>
              <xs:attribute name="Remove" type="xs:int" default="0" />
            </xs:complexType>
          </xs:element>
        </xs:choice>
      </xs:complexType>
    </xs:element>
  </xs:sequence>
</xs:complexType>
</xs element>
</xs:schema>
```

The elements of the MCXML schema are as follows:

FileSystem Element

This element can be used to represent files and/or folders that will be added, removed, or modified in a virtual image, such as a SFT file for example. This element may be empty which indicates that no changes to the file system will be made.

File Element

This element can be used to represent a single add, remove, or edit of a file or folder. There is an optional remove attribute to this element. Remove can be 0 (meaning do not remove) or 1 (remove this file or folder). As defined in the schema, if missing the attribute, the default is remove="0".

Source Element (Optional)

This element can be used as a container for the next three elements which together define where to get a file from for the virtual image. If it is a remove action, there is no need for anything under this element. Even if not a remove action, this element may be optional and not required for an action that changes the file type property for example. However, if it is an edit action and the target file does not exist in the virtual image and is not mentioned under this element, the MC component 116 can log that it was unable to edit the file and move on to the next one.

SourceFolder Element

This element can be used to describe a folder where a file is located and can be represented as an absolute path. This element can point to a file on a local machine, a file in a cabinet (CAB), or a universal naming convention (UNC) path. This element can be used in conjunction with Source-Name element below.

SourceName Element

The name of a file to be added to a virtual image.

SourceCabFile Element

This element can be used to identify a CAB file where a file is obtained from. Used in conjunction with the Source-CabKey element.

SourceCabKey Element (Optional)

If the source file is in a CAB, this element provides information on how to obtain the source file (the SourceCabKey is a primary key in the CAB).

Target Element

The elements under the target element describe where a file should be located in a virtual image. The MC component 116 can log and skip over any file elements without a target element.

TargetFolder Element

This element can be used to describe a folder in a virtual image. A folder can be created if not yet in existence.

TargetName Element

This element can correspond with a name of a file to be added into a virtual image. If the file action is removing or adding an entire directory, this element can be ignored by the MC component 116. If the action is to add a file and this element is missing (or invalid), the MC component 116 can use a value associated with the SourceName element.

FileAttributes Element

This element can be used to indicate what attributes the file/folder may have: Ready Only, Hidden, etc. If not provided, the MC component 116 can use a default value of zero.

FileSize Element (Optional)

Since install scripts can be used to provide the file system, the information can be included into a virtual image index without having to find the size. If this property is missing and a file is being added, then the MC component 116 can retrieve the information from the source file.

SoftricityfileType (Optional)

Files/Folders can be Application data, application configuration, user data, or user configuration data types in an SFT image file. If missing, the MC component 116 can use a default value of Application data.

Permanent Flag

The Permanent flag can be used to force the preservation of any client changes, even if there are changes made on the sequencer component 202 during a package upgrade.

Override Flag

The Override flag can be used to force the replacement of any client changes with changes made on the sequencer component 202 during package upgrade.

Registry Element

This element can be used to represent all registry changes captured in a virtual registry. Elements under this element describe adds, edits, and removals of keys and/or names and values. This element can be optional. If not present, no changes will be made to the virtual registry.

KeyAction Element

Each KeyAction element can be used to describe a change to a virtual registry which may be an add, edit, or a removal. There is an optional remove attribute to this element. Remove can be any of the following: 0—meaning do not remove, 1—remove all child keys and name/value pair and make this key a tombstone, or 2—remove this key (and everything under it) completely from the virtual registry. If missing or invalid, the MC component 116 will default to zero.

Key Element

This element contains a full key name, including the appropriate hive key HKEY part at the front. An HKEY is a top level machine registry key. For example, top level HKEYs can include HKEY_CURRENT_USER, HKEY_LOCAL_MACHINE, HKEY_CLASSES_ROOT, and HKEY_USERS. The key element can be required for every KeyAction element. If missing, the MC component 116 will log this fact and skip to the next action.

Name Element (Optional)

This is the name part of a name/value pair under the above key. If missing, then the action represents an action to the key itself, not a name/value pair.

Value Element(Optional)

This element may not be required when removing a key or a name/value pair. Also, it may not be required if an action represents an edit to a virtualize property of the key. It can be required when adding a new name/value pair and the MC component 116 can log an error and skip to a next file if an attempt is made to add a name without a value. The ValueType attribute can be used to represent a type of value: String, binary, double word (DWORD), etc. A missing (or invalid) type attribute can be interpreted by the MC component 116 as String type (REG_SZ).

In an embodiment, a properties description (PD) XML file can be input to the sequencer component 202 to set high-level virtual application properties, such as image compression type, image block size (size of SFT chunks), image version, virtual product root, etc. The sequencer component 202 can receive a PD XML file and the PC component can be used read the package details as part of creating a base virtual package 204, such as a base virtual application image for example. In one embodiment, a PD XML file can be defined according to the schema below.

```
<?xml version="1.0" encoding="utf-8"?>
<xs:schema xmlns="http://tempuri.org/PackageDetails.xsd"
 xmlns:xs="http://www.w3.org/XMLSchema">
  <xs:element name="PackageDetails">
    <xs:complexType>
      <xs:sequence>
        <xs:element name="SFTHeader" maxOccurs="1" minOccurs="0">
          <xs:complexType>
            <xs:sequence>
              <xs:element name="fileVersion" type="xs:int" default="1" minOccurs="0" maxOccurs="1" />
              <xs:element name="DateCreated" type="xs:date" minOccurs="0" maxOccurs="1" />
              <xs:element name="DateModified" type="xs:date" minOccurs="0" maxOccurs="1" />
            </xs:sequence>
          </xs:complexType>
        </xs:element>
        <xs:element name="PackageProperties" maxOccurs="1" minOccurs="0">
          <xs:complexType>
            <xs:sequence>
              <xs:element name="EncodingType" type="xs:string" default="BZIP" maxOccurs="1" minOccurs="0" />
              <xs:element name="BlockSize" type="xs:int" default="32" maxOccurs="1" minOccurs="0" />
```

```
            <xs:element name="ProductPath" type="xs:string" default="OfficeC2R"
maxOccurs="1" minOccurs="0" />
            <xs:element name="ProductName" type="xs:string" default="Office
Click2Run" maxOccurs="1" minOccurs="0" />
            <xs:element name="PackageGUID" type="xs:string" minOccurs="0"
maxOccurs="1" />
          </xs:sequence>
        </xs:complexType>
      </xs:element>
      <xs:element name="ServerProperties" maxOccurs="1" minOccurs="0">
        <xs:complexType>
          <xs:sequence>
            <xs:element     name="ServerPort"    type="xs:int"    maxOccurs="1"
minOccurs="0" default="80" />
            <xs:element     name="SFTPath"     type="xs:string"    maxOccurs="1"
minOccurs="0" />
            <xs:element    name="ServerProtocol"    type="xs:string"   maxOccurs="1"
minOccurs="0" />
          </xs:sequence>
        </xs:complexType>
      </xs:element>
    </xs:sequence>
  </xs:complexType>
</xs:element>
</xs:schema>
```

The elements of the PD XML schema are as follows:

SFTHeader

A top level element including properties to set in an virtual image header.

FileVersion

This element can be used to set an internal package version.

DateCreated/DateModified

These elements can be used to override the normal date-created/datemodified values internal to a virtual image.

PackageProperties

A top level element which can be used to set properties of a virtual package.

Encoding Type

This element can be used to define how to encode a virtual application image.

BlockSize

This element can be used to define block sizes to use in a virtual application image.

ProductPath

This element can be used to define an internal location in an image as to applications files are located.

ProductName

This element can be used to define a friendly name for an application/product that will be virtualized.

PackageGUID

This element defines a global unique identifier (GUID) which can be used to identify an application/product.

ServerProperties

This element can be used to define a top level node for elements that relate to a virtual application image server, such as server 106 for example.

ServerPort

This element can be used to define a port where an image can be obtained from.

SFTPath

This element can be used to define a uniform resource locator (URL) to a virtual application image.

ServerProtocol

This element can be used to define a protocol which can be used to transfer virtual application bits.

In an embodiment, an optimization XML (e.g., OPTXML) file can be input to the sequencer component 202 which can describe feature blocks 212 and/or faux feature blocks 214 to be associated with the virtual package 204. For example, the optimization component can use an OPTXML file to define which blocks application 1 needs to boot, which blocks application 2 needs to load for a spellchecker, which blocks application 3 needs to load for a pivot table, etc. The optimized feature block descriptions can be used by the sequencer component 202 to set and order the feature blocks.

As one example, an OPTXML file for feature blocks FB1 and FB2 includes corresponding blocks being set to 1 or 2 appropriately. OPTXML files of an embodiment for faux feature blocks store block information in faux feature block list files which can be stored at the root of an image. Feature blocks in an image can be ordered so that more commonly used blocks are downloaded before less commonly used blocks. However, when a user runs a virtual application, some feature blocks may be downloaded based on a behavior or feature. In one embodiment, a default order for the blocks includes: FB1; Product boot faux feature blocks; faux feature blocks of priority 1, . . . , faux feature blocks of priority N; and, any remainder of FB2.

In one embodiment, the sequencer component 202, an encoder, or other component can operate to generate and order data blocks of an image (e.g., SFT image) by: 1) virtual application (e.g., AppV) Feature Block (e.g., FB1 before FB2); 2) File "version number" (e.g., SFTs are versioned such that new or changed data blocks are marked with the corresponding version number (e.g., new or changed blocks marked as file version 4 or v4)); and, 3) an arbitrary order. For example, the arbitrary order can include adding blocks from files by iterating the directory structure and enumerating the files.

In another embodiment, the sequencer component 202 can operate to generate and order data blocks of an image (e.g., SFT image) by: 1) virtual application Feature Block (e.g., FB1 before FB2); 2) File "version number" (e.g., SFTs are versioned such that new or changed data blocks are marked with the corresponding version number (e.g., new or changed blocks marked as file version 4 or v4)); 3) Primary FFB(s) in increasing order; 4) secondary FFB(s) in decreasing order); and, 5) an arbitrary order.

In accordance with an embodiment, primary FFB(s) and secondary FFB(s) refer to ordering of blocks by Feature Block as specified in OPTXML. Feature Blocks can be assigned index values based in part on their appearance in OPTXML, with the first Feature Block assigned index 1, the second Feature Block assigned index 2, etc. For Primary FFB(s) of one embodiment, each block can be ordered by the first (and hence lowest-index value) Feature Block that includes the corresponding block from the lowest index value to the highest index value, wherein blocks that are not included in any Feature Block are sorting last. For Secondary FFB(s) of one embodiment, each block can be ordered by the second Feature Block that includes the corresponding block from the highest index value to the lowest index value, wherein blocks that are not included in any Feature Block are sorted first.

As one result, the sequencer component 202, encoder, or other component can generate an image that includes optimized overlapping ranges by reversing the ordering between Primary and Secondary FFB. In one embodiment, the virtual application sequencer can use the "Priority" field of OPTXML as the index for each Feature Block, rather than arbitrarily assigning index values based on the appearance in OPTXML.

In an embodiment, an OPTXML file can be defined using the schema below.

```xml
<?xml version="1.0" encoding="utf-8"?>
<xs:schema xmlns="http://tempuri.org/OptXML.xsd"
xmlns:xs="http://www.w3.org/XMLSchema">
    <xs:element name="OptXML">
     <xs:complexType>
      <xs:sequence>
       <xs:element name="FeatureBlocks">
        <xs:complexType>
         <xs:sequence minOccurs="0" maxOccurs="unbounded">
          <xs:element name="FeatureBlock">
           <xs:complexType>
            <xs:sequence>
             <xs:element name="Folders">
              <xs:complexType>
               <xs:choice minOccurs="0" maxOccurs="unbounded">
                <xs:element name="Folder" type="xs:string" />
               </xs:choice>
              </xs:complexType>
             </xs:element>
             <xs:element name="Files">
              <xs:complexType>
               <xs:choice minOccurs="0" maxOccurs="unbounded">
                <xs:element name="File">
                 <xs:complexType>
                  <xs:sequence>
                   <xs:element name="FilePath" type="xs:string" />
                   <xs:element name="FileName" type="xs:string" />
                   <xs:element name="Pages">
                    <xs:complexType>
                     <xs:choice minOccurs="0" maxOccurs="unbounded">
                      <xs:element name="Range">
                       <xs:complexType>
                        <xs:sequence>
                        </xs:sequence>
                        <xs:attribute name="start" type="xs:int" use="required" />
                        <xs:attribute name="end" type="xs:int" />
                       </xs:complexType>
                      </xs:element>
                     </xs:choice>
                    </xs:complexType>
                   </xs:element>
                  </xs:sequence>
                 </xs:complexType>
                </xs:element>
               </xs:choice>
              </xs:complexType>
             </xs:element>
            </xs:sequence>
            <xs:attribute name="FBID" type="xs:string" use="required" />
            <xs:attribute name="append" type="xs:boolean" use="optional" default="true" />
            <xs:attribute name="AppGUID" type="xs:string" use="optional" />
            <xs:attribute name="priority" type="xs:int" use="optional" />
           </xs:complexType>
          </xs:element>
         </xs:sequence>
        </xs:complexType>
       </xs:element>
      </xs:sequence>
     </xs:complexType>
    </xs:element>
</xs:schema>
```

The elements of the OPTXML schema of an embodiment are as follows:

FeatureBlocks Element

This element can be used to define a top level element for the associated XML file. The feature blocks fall under this element.

FeatureBlock Element

This element can be used to define a single feature block, listing all files or folders in the associated block. This element includes an attribute "FBID" which can be used to represent a feature block identifier. If the attribute is missing or is invalid, the optimization component will do nothing for this feature block. Other optional attributes can include: AppGUID, priority, and append. AppGUID and priority attributes can be passed on to the faux feature block lists (FFBLists) files. The append attribute (Boolean) signals whether or not this is a new feature block, or to add a new feature block. If false, then any files in the image already assigned to that feature block can be removed. If true (default), then this feature block may already exist and the resulting feature block may have a mix of old and new blocks.

Folders Element

This element can be used to define put files in a folder (and its subfolders) in an associated feature block.

Folder Element

This element can be used to define an absolute path to a folder in the virtual file system. All files in that folder and subfolders (recursive) can then be contained in the associated feature block. If the specified folder does not exist in the virtual image, the optimization component can log the details and proceed to the next folder.

Files Element

This element can be used to define a top level node for all files in an associated feature block.

File Element

This element can be used to define a file that can be in an associated feature block. If the specified file is not in a virtual image, the optimization component can log the details and proceed to the next file.

FilePath Element

This element can be used to define an absolute path to an associated file in a virtual image. If the element is missing, the optimization component can log an error and continue to the next file. The element can contain a Constant Special item ID list (CSIDL) corresponding to tokens that represent special folders on a machine.

FileName Element

This element can be used to define a name of a file to be included in an associated feature block. If the element is missing, the optimization component can log an error and continue to the next file.

Pages Element

This element can be used to define which pages should be in an associated feature block. If the element is missing, then the optimization component can include all the pages in the associated feature block.

Range Element

This element can be used to define a range of pages to include in an associated feature block. The element can include a start attribute (e.g., having a positive integer value) defining a page to start including in an associated feature block. The element can also include an end attribute (e.g., having a positive integer value) which can be optional provisioned. If present, the end attribute can be used to designate a last page of an associated range (inclusive). If the end attribute is absent or if the start attribute has a greater value than the end attribute value, then the optimization component will only include the start page.

The environments described herein can be implemented as part of networked, distributed, or other computer-implemented environment. The environments and components can communicate via a wired, wireless, and/or a combination of communication networks. A number of client computing devices, including desktop computers, laptops, handhelds, or other smart devices can interact with and/or be included as part of an environment.

In alternative embodiments, the various components can be combined, further divided, and/or configured according to a desired implementation. Moreover, one or more components of the exemplary environments can be implemented in hardware and/or software. Also, while certain embodiments include software implementations, they are not so limited and may encompass hardware, or mixed hardware/software solutions. Other embodiments and configurations are available.

Figure 3:
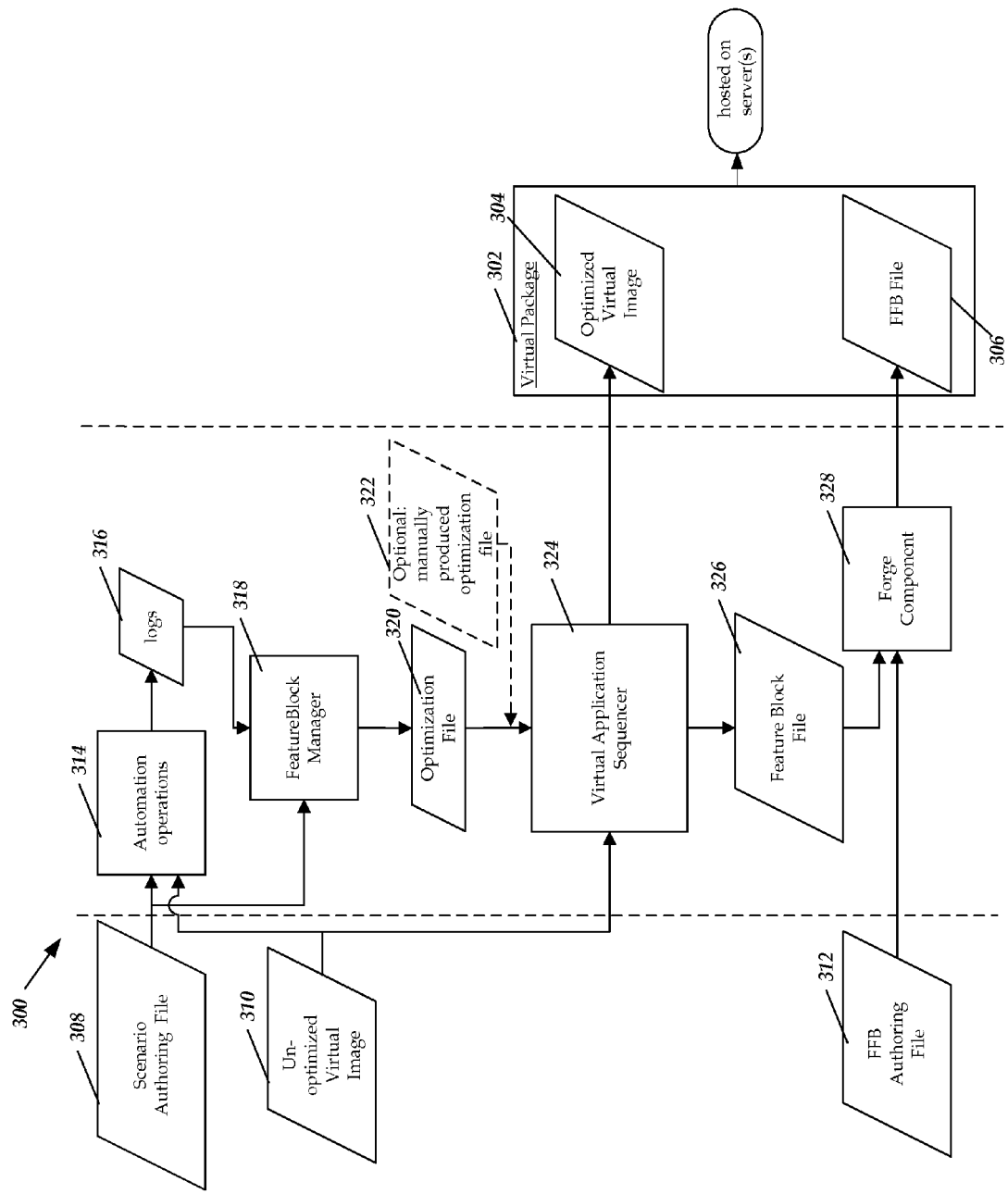
FIG. 3 is a flow diagram illustrating an exemplary process of generating an optimized virtual package.

FIG. 3 is a functional diagram illustrating aspects of an optimization process 300 used in implementing application virtualization and streaming functionality of a computing environment, under an embodiment. In an embodiment, the optimization process 300 can be used as part of a streaming service to provide application and other functionality to a requesting client over the Internet. For example, upon clicking a hyperlink, application functionality (e.g., features of a word processing application, features of a presentation application, features of a spreadsheet application, features of a drawing application, etc.) can be downloaded and provided to a user based in part on the target of the hyperlink.

As described below, the optimization process 300 can be used to generate an optimized virtual package 302, but is not so limited. An optimized virtual package 302 resulting from the optimization process 300 can be hosted or otherwise provided for use to requesting clients, but is not so limited. In one embodiment, the optimization process 300 can be used to create an optimized virtual package 302 including an optimized virtual image 304 or file (e.g., optimized SFT file) and a faux feature block file 306 (e.g., FFB.XML) which can be hosted and used to provide virtual application features and other functionality to a requesting client. For example, byte ranges of the optimized virtual package required to launch a virtual application and one or more application features can be selectively provided to a bootstrapping component and/or a virtual application handler as part of an online virtual application experience.

As shown in the example of FIG. 3, the optimization process 300 utilizes a number of files as inputs to various optimization components and/or processes, but is not so limited. In one embodiment, a scenario authoring file 308 (e.g., ScenarioAuthoring.XML), an un-optimized virtual image 310 (e.g., un-optimized softricity file type (SFT)), and/or a FFB authoring file 312 (e.g., FFBAuthoring.XML) can be used as optimization inputs to generate an optimized virtual package 302 corresponding to a number of virtual applications images optimized for Internet streaming.

As discussed above, the un-optimized virtual image 310 can include a generic or un-optimized bit pattern corresponding in part to the operations of a virtual application sequencer. The scenario authoring file 308 (e.g., XML file) can be used to map automation scenarios to feature blocks or portions thereof. Feature blocks can be composed of single or multiple automation scenarios. For example, an XML authoring component can be used to produce one or more scenario authoring files 308 that include mappings between various automation scenarios and feature blocks of a virtual image.

The optimization process 300 utilizes an automation process or component 314 that uses one or more scenario authoring files 308 and an un-optimized virtual image 310 to generate a number of log files 316. In one embodiment, automation includes executing automation scenarios of one or more scenario authoring files 308 against the un-optimized virtual image file 310, resulting in a number of OOS logs. The OOS logs include information describing pertinent image or functional portions required for each executed scenario. For example, the OOS logs can be used to uncover relevant byte ranges of scenario-driven application features for example.

The optimization process 300 utilizes a feature block manager 318 which uses information contained in the log files 316 to generate optimization data. In one embodiment, the feature block manager 318 operates to read OOS logs and perform operations specified in the scenario authoring file 308 (e.g., ScenarioAuthoring.XML) to produce optimization data (e.g., OPTXML) defining all the feature blocks of an optimized image according to the executed scenarios, but is not so limited. For example, the feature block manager 318 can use OOS log information to generate OPTXML files that describe feature block characteristics which correspond to application launch and feature scenarios. Correspondingly, scenario-driven byte ranges can be used to stream application functionality to an end-user, depending in part on a requested feature. As shown in FIG. 3, in an alternative embodiment, OPTXML files can be manually produced at 322.

The optimization process 300 utilizes a virtual application sequencer 324 that uses the un-optimized virtual image 310 and one or more of the optimization files 320 as inputs to generate a feature block file 326 (e.g., FeatureBlock.XML) and the optimized virtual image 304. In one embodiment, the virtual application sequencer 324 comprises a XML encoder that uses one or more OPTXML files and the un-optimized virtual image 310 to reorder or rearrange bits of the un-optimized virtual image 310 to generate feature block XML and the optimized virtual image 304. For example, the XML encoder can operate to move or relocate all new resources marked as Feature Block 1 in the OPTXML files to the front of a new optimized image file (e.g., SFT file) in accordance with the executed scenarios. Any remaining feature blocks can be reordered to keep the feature block resources defragmented. In one embodiment, the XML encoder generates a FeatureBlocks.XML file that includes mappings of feature block identifiers to SFT byte ranges, and a list of SFT data block offsets.

As described briefly above, the optimization process 300 uses a FFB Authoring file 312 (e.g., FFBAuthoring XML) which defines scenarios that are composed of one or many feature blocks or other scenarios. In one embodiment, the FFB Authoring file 312 also defines a default scenario which represents a default order to download feature blocks (e.g., presentation application boot, providing spell check and thesaurus features, word processing boot, etc.). The optimization process 300 utilizes a forge component 328 that uses the FFB Authoring file 312 and the feature block file 326 as inputs to generate the FFB file 306 (e.g., FFB.XML). In one embodiment, the forge component 328 uses the FFB authoring XML and feature block XML to generate FFB XML which defines all scenarios, maps feature blocks to SFT byte ranges, and/or includes a list of SFT data block offsets.

As part of the optimization process 300, the forge component 328 of an embodiment constructs the FFB file 306 to include organized and scenario-driven block data structures that represent parts or portions of an application image and/or functionality configured to optimize streaming of a virtual application or applications over the Internet. For example, the forge component 328 can construct the FFB file 306 to include certain blocks and ranges of an application image required to provide application features or functionality for a given task or tasks.

As one example, as a result of implementing the optimization process 300, the forge component 328 can construct the FFB file 306 to include a word processing application boot process which includes blocks 3,7,12-14, and 22; a spreadsheet application boot process which includes blocks 3,7, 13-15, 20-24, etc. In one embodiment, if there are inordinately large block overlaps, the forge component 328 can operate to break out any associated overlapping blocks into a separate FFB.

The optimization process 300 of an embodiment, can generate a virtual package 304 that includes one or more of the following types of FFBs: Product Boot FFBs; App Boot FFBs, and/or Feature-level FFBs. Once generated, the virtual package 304 of an embodiment which comprises an optimized virtual image 304 and one or more FFB files 306 can be pushed to a web server or servers, or some other type of server or computing system, and available for use to end-users, as described below. Once installed, a virtual application handler or other component can be used to retrieve or download remaining bits and byte ranges of the optimized virtual application image.

Figure 4A:
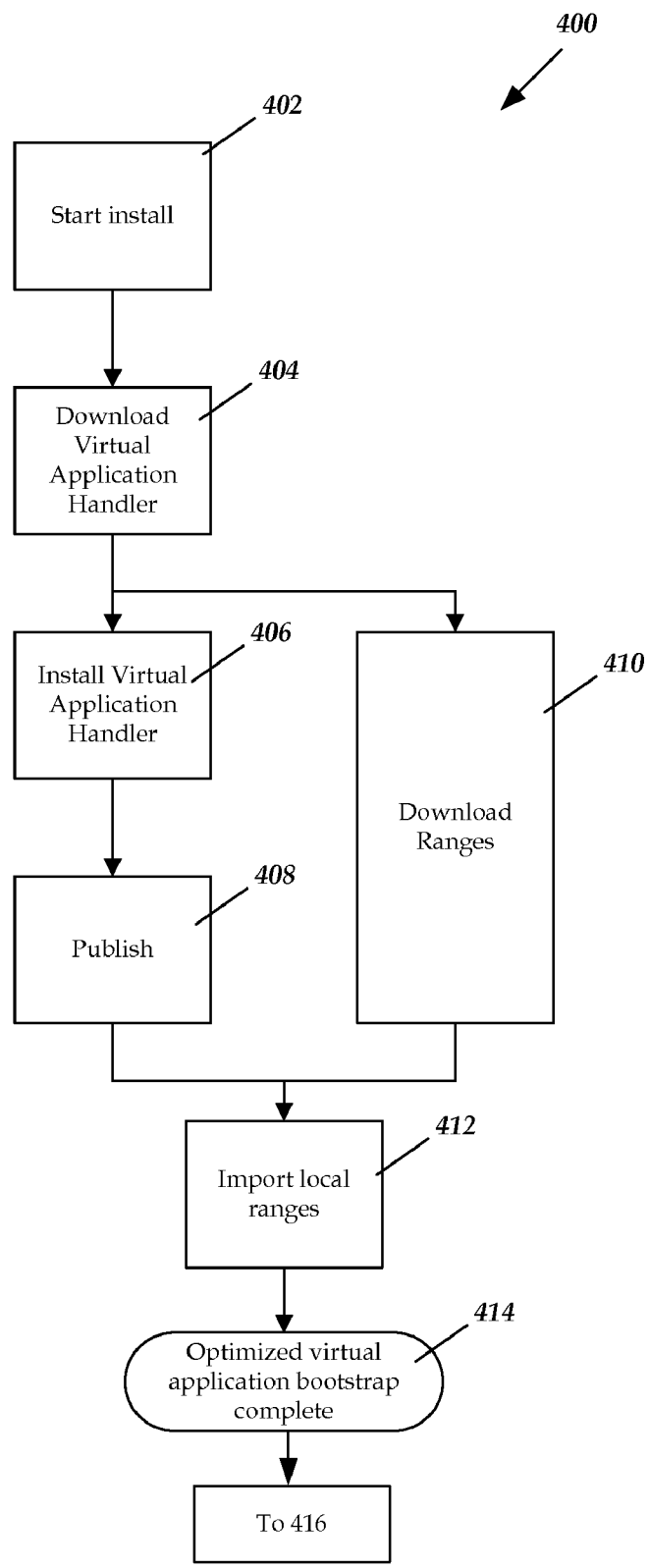
FIGS. 4A-4B are flow diagrams illustrating an exemplary process of using an optimized virtual package.
Figure 4B:
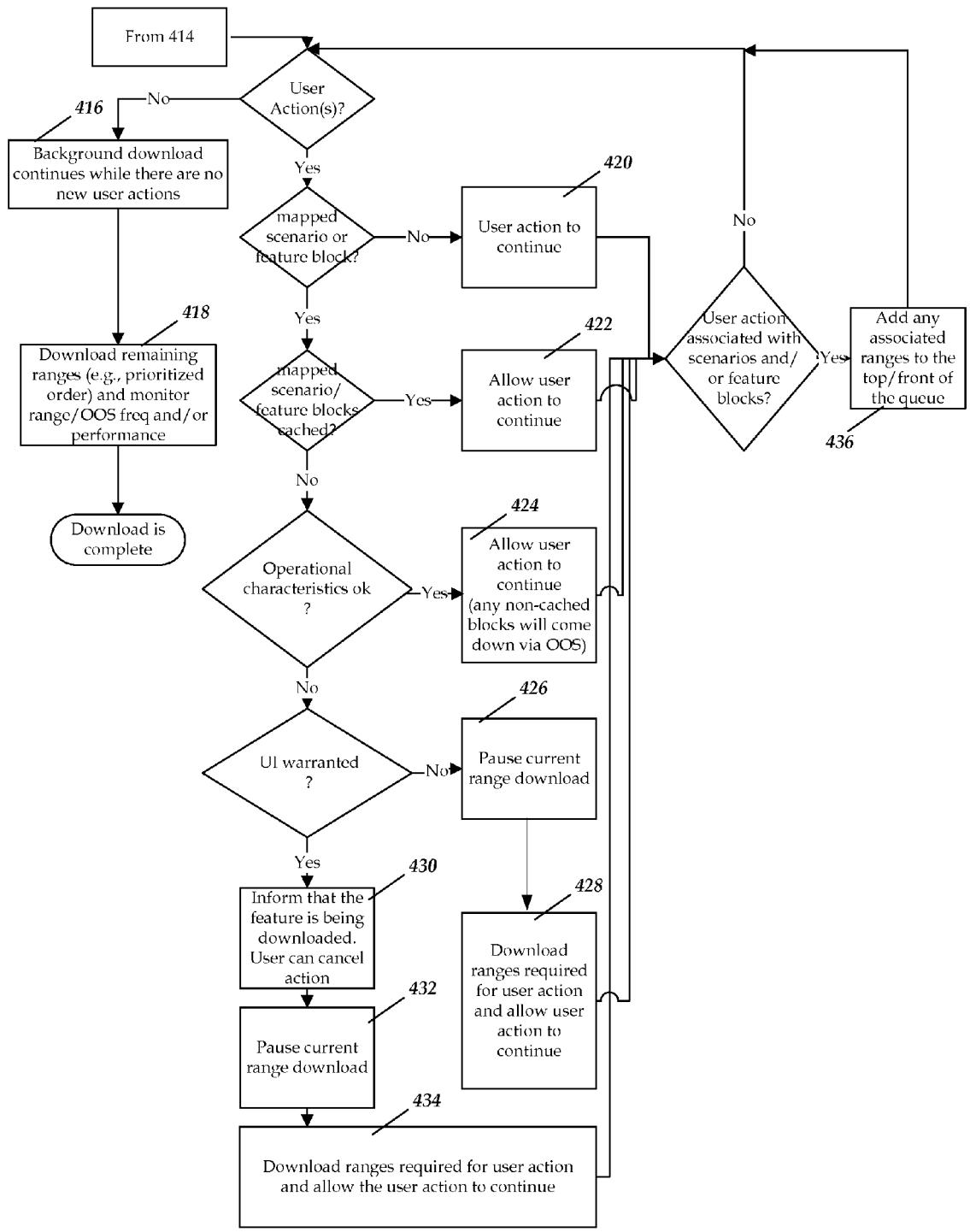

FIGS. 4A-4B are flow diagrams illustrating an exemplary process of using an optimized virtual package. FIG. 4A is a flow diagram depicting part of an exemplary process 400 that includes pre-fetching byte ranges of an optimized virtual image using a bootstrapping feature. At 402, an installation procedure to install a virtual application handler begins based in part on a user action, but is not so limited. In an embodiment, as part of using a computing device or system to navigate to a file or request a service, a virtual application handler installer can be downloaded to the computing device and used to install the virtual application handler on the user's computing device.

In one embodiment, the installation procedure follows a default experience or scenario by downloading or streaming pre-determined virtual application functionality to the client device or system. As an example, a default procedure ensues when a user clicks on a "Click here to get Office®" link using a web browser. As part of the default procedure, bits, byte ranges, and/or FB(s), and/or FFB(s) required to launch a presentation application are first downloaded as part of providing application features of a virtual application suite (e.g., virtual Office® applications). For such a default scenario, the presentation application launches at the end of the bootstrap process.

In another embodiment, the installation procedure follows a scenario-driven experience by downloading or streaming scenario-driven virtual application functionality to the client device or system based in part on the user action or request. For example, the scenario-driven experience ensues when a user clicks on a document or other file stored in online computer storage (e.g., Office Live® website) and the virtual application begins bootstrapping. In contrast to the example default scenario discussed above, bits, byte ranges, and/or FB(s), and/or FFB(s) required to launch a word processing application are first downloaded as part of providing application features of a virtual application suite (e.g., virtual Office® applications). For such a word processing scenario, the word processing application launches at the end of the bootstrap process.

At 404, the client virtualization handler is downloaded to the user's device or system. In one embodiment, the process 400 includes: installing the client virtualization handler at 406 and using the client virtualization handler to publish downloaded or requested virtual application(s) at 408 to create entry points to the virtual application(s) (e.g., shortcuts, file associations, etc.), and in parallel, pre-fetching virtual application features or functionality at 410 by downloading appropriate application ranges. For example, pre-fetching operations can track the default procedure or order, or as described above, be based in part on how the bootstrapping process was initiated. In an embodiment, the pre-fetching operations include storing pre-fetched bits and/or byte ranges in a locally allocated cache (e.g., pseudo-cache) of associated memory. Correspondingly, the bootstrapping process attempts to download and store as many bits and byte ranges of the virtual image as possible during the client initialization process. The amount of retrieved information is based in part on the underlying computing and network characteristics.

At 412, the installed client virtualization handler operates to import the pre-fetched bits and/or byte ranges from the pseudo-cache into allocated virtual application cache. The pre-fetched bits and/or byte ranges can then be deleted from the pseudo-cache. At 414, the bootstrapping procedure completes and the flow proceeds to 416 of FIG. 4B where the client virtualization handler continues to downloaded and store application bits and/or byte ranges in the virtual application cache, as discussed below. Correspondingly, instead of starting in a zero or nearly empty cached state, the virtual application cache includes pre-fetched bits and/or byte ranges.

In accordance with an embodiment, the process 400 of FIG. 4B is based in part on an interrupt driven non-deterministic process based in part on user actions or lack thereof and/or a virtualization state (e.g., what caused an application or applications to boot? what application features are being used?, etc.). The client virtualization handler is configured to detect and/or know when an application is being booted or used, including application feature granularity since virtualization operations are routed through the client virtualization handler. Correspondingly, the client virtualization handler can adapt virtualization operations to user actions as part of caching an entire application or suite of applications, while minimizing OOS requests and not blocking user actions.

At 416, the client virtualization handler can include a background download system or application used to download bits and byte ranges in the background if there are no new user actions or inputs. At 418, the background download continues to download byte ranges according to a prioritized queue until all of the byte ranges are cached in the virtual application cache. The client virtualization handler of an embodiment includes functionality to measure range download times, OOS request frequencies, and/or performance parameters.

If the client virtualization handler detects a user action, the client virtualization handler then determines if the user action corresponds with a mapped scenario and/or feature block. For example, the client virtualization handler can use the FFB file to determine scenario mappings and/or feature blocks which correspond to a particular a user action. At 420, if the user action is not associated with a scenario and/or feature block, the client virtualization handler allows the action to proceed. For example, an application feature may not have an associated boot feature block due in part to a minimal size and when performance is not a goal for the feature.

At 422, if the user action is associated with a mapped scenario or feature block and the corresponding byte ranges are already cached, the client virtualization handler allows the user action to proceed. For example, the client virtualization handler has knowledge of prior and current byte range downloads and can also query the virtual application cache or another store to determine downloaded content as necessary.

In an embodiment, the background download system of the client virtualization handler can provide operational and other characteristics associated with the download. For example, the background download system can operate to report that a certain threshold percentage or amount of a scenario bit range and/or feature block associated with the user action has already been downloaded to the virtual application cache and/or that sufficient network capacity is available to download associated byte ranges OOS at 424.

As one example, the client virtualization handler can allow the user action to proceed if greater than seventy percent of the bits of a mapped scenario have been downloaded by downloading remaining bytes OOS. As another example, as part of monitoring the download speed of a download operation, the download system can report sufficiently available and high (e.g., 100+ Mbps) network transfer speeds such that the OOS delay would be negligible or unnoticed. In such a case, the client virtualization handler can allow the user action to proceed and have the bytes downloaded OOS.

As shown in the exemplary process 400, the client virtualization handler of an embodiment can use the background download system to control download pausing, download re-prioritizing, and/or download restarting or canceling as part of providing virtual application features to an end-user based in part on the user action. For example, the background download system can operate to pause or hold a current byte range download at 426 when the ranges required to satisfy the user action are not significant enough to affect the user experience, and download ranges required for the user action at 428 to allow the user action to continue.

Alternatively, if significant enough (e.g., based in part on remaining ranges, observed network transfer performance, etc.), the client virtualization handler can provide and display a user interface (UI) at 430 to inform the user that the bytes required for the action are being downloaded. For example, the background download system of the client virtualization handler can report that there are significant ranges required to be downloaded for performing a particular user action and a UI can be presented to the user of the feature download wait time.

In one embodiment, the UI can include a cancel option which, when selected (e.g., clicked), can terminate the user action which caused the UI to spawn, and the background download system can immediately cancel the range download. Upon cancellation, ranges that compose the scenario and/or feature block for the user action(s) are prioritized and pushed to the top of the download list or queue. At 432, the background download system can operate to pause or hold a current byte range download if the user has not cancelled the action, and download ranges required for the user action at 434 to allow the user action to continue.

As an example, a user action comprises clicking on a word processing application shortcut to start the application. However, the virtual application cache contains no boot byte range(s) and/or feature block(s) to boot the application. In such an example scenario, the client virtualization handler can provide a splash screen informing a user that the application is loading while the remaining bytes can be downloaded by the background download system. If the user selects the cancel button on a UI splash screen, then the boot operation is canceled by the client virtualization handler. If the user does not cancel the operation, once all the required virtual application bytes are cached, the splash screen exits and the word processing application launches with no OOS requests since the ranges have been cached in the virtual application cache.

After the user action is allowed to proceed (e.g., at 420, 422, 424, 428, and 434), the client virtualization handler of an embodiment can operate to detect if there are any related scenario/feature blocks associated with the user action. If the client virtualization handler determines that there are related scenario/feature blocks, the background download system prioritizes the related scenario/feature blocks at the top of the background download list or priority queue at 436. The flow returns to detecting or waiting on a user action while continuing the background download of ranges. Eventually, the background download system will complete the caching of an entire virtual product or package, requiring no additional streaming optimizations since all resources will be available locally in the virtual application cache.

As an example, assume that the word processing application has booted as a result of the user clicking on a web-based document. In such a scenario, the spelling and grammar check feature block is related to the word processing application. Thus, after playing the word processing application boot ranges and allowing the word processing application to boot, the client virtualization handler can then add the spelling and grammar feature block to the top of the download queue. Correspondingly, when the user invokes the spell checker, the client virtualization handler will not need to play the associated range(s) OOS.

While a number of methods, components, and functionality have been described above, other methods, components, and/or functionality can be implemented in other embodiments, including order and/or types of operations to implement certain access control functionality, and other embodiments are available. The computing environments, systems, and/or embodiments described herein can be configured to include networking, security, and/or other communication functionality to provide a communicative environment. Accordingly, the environments and components include functionality to communicate with other computing devices, communication devices, and/or other systems and are not intended to be limited to the embodiments and examples described herein. Moreover, components can be configured to communicate via a wired, wireless, and/or combination of various communication networks.

The computing environments and systems described herein can be configured as a networked environment that includes software, firmware, hardware, and other components to provide a distributed computing environment under certain embodiments. Additionally, while a certain number and configuration of components are described and shown, other numbers of components and configurations can be used. For example, a computing environment can include a plurality of computing devices, clients, servers, repositories, and/or other components.

Exemplary Operating Environment

Figure 5:
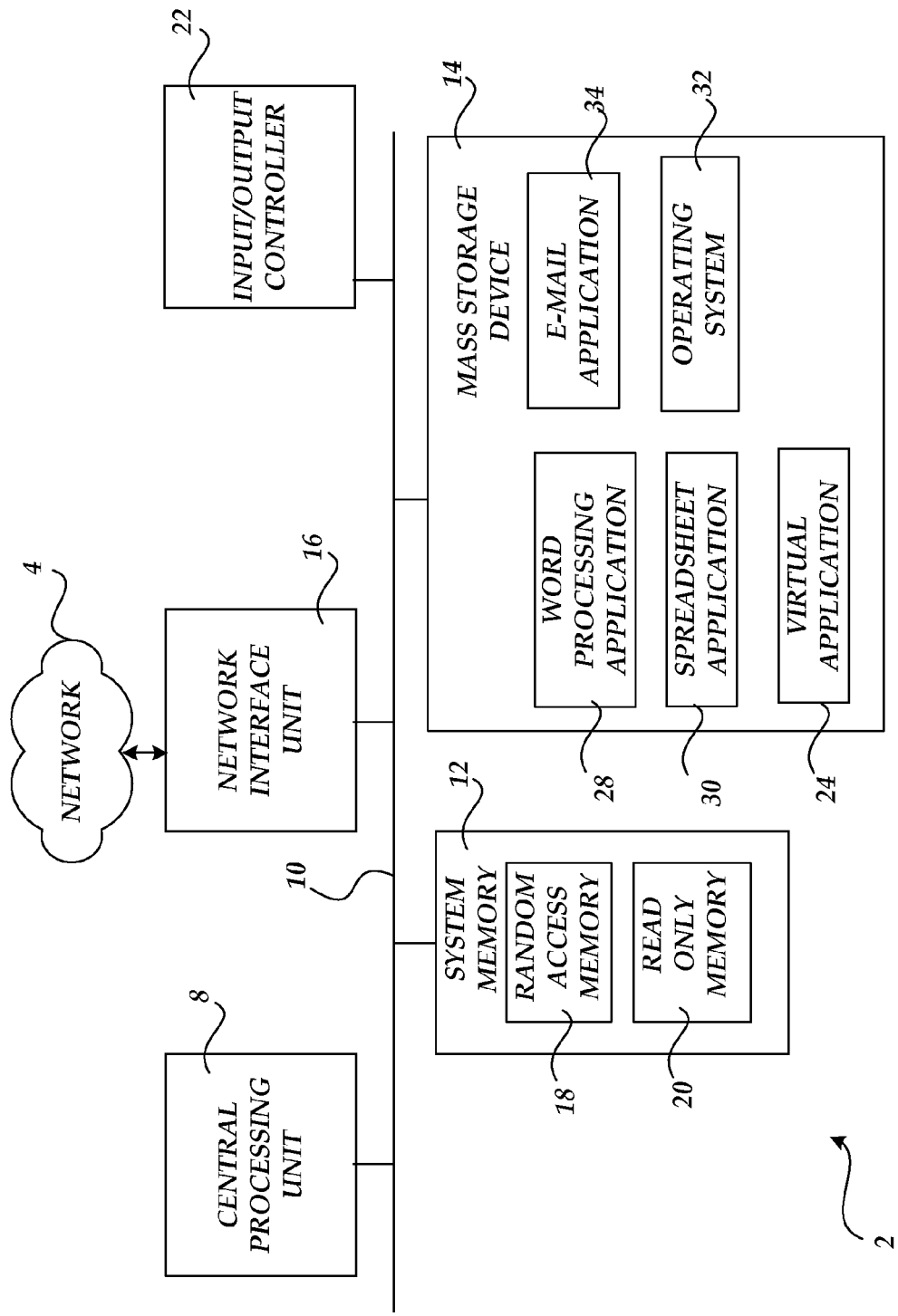
FIG. 5 is a block diagram illustrating a computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a virtual application 24, word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system to provide virtual information comprising:
   at least one processor and memory;
   a virtual application encoder to use a base virtual application image and optimization data as inputs to generate a feature block file and an optimized virtual application image including a number of feature blocks and faux feature blocks which correspond to a suite of virtual applications of an optimized virtual package; and,
   a forge component to use the feature block file and a faux feature block authoring file as inputs to generate a faux feature block file describing scenario mappings to byte ranges of the optimized virtual application image, wherein the faux feature block file and the optimized virtual application image are stored in the memory.

2. The system of claim 1, further comprising a feature block manager to generate the optimization data.

3. The system of claim 1, wherein the feature block manager uses a scenario authoring file and automation data to generate the optimization data.

4. The system of claim 1, further comprising using automation operations to generate a number of out-of-sequence (OOS) logs describing pertinent image portions required for each executed application scenario.

5. The system of claim 1, further comprising a server to host the faux feature block file and the optimized virtual application image.

6. The system of claim 5, further comprising a client virtualization handler to selectively download byte ranges of the optimized virtual application image based in part on user actions and the scenario mappings.

7. The system of claim 6, further comprising a bootstrapping component to pre-fetch and store byte ranges of the optimized virtual application image in a pseudo-cache during installation of the client virtualization handler.

8. The system of claim 7, wherein the client virtualization handler moves pre-fetched byte ranges from the pseudo-cache to a virtual application cache after installation and continues downloading byte ranges of the optimized virtual package.

9. The system of claim 6, the client virtualization handler further comprising a download manager to dynamically determine bits of a virtual application launch to delay based in part on a user action while downloading scenario-based byte ranges as part of a background stream.

10. The system of claim 9, the download manager further operable to dynamically reorder the background stream based in part on the user actions and a priority queue.

11. The system of claim 9, the download manager further operable to use the faux feature block file to determine scenarios and feature blocks including block offsets and range mappings of the optimized virtual package.

12. The system of claim 1, wherein the virtual application encoder comprises a XML encoder and is operable to use OPTXML and the base virtual application image to reorder bits of the base virtual application image to generate feature block XML and the optimized virtual application.

13. The system of claim 1, wherein the forge component is further operable to generate FFB XML to define all scenarios, map feature blocks to byte ranges, and list data block offsets.

* * * * *